United States Patent
Fan et al.

(10) Patent No.: US 7,608,560 B2
(45) Date of Patent: Oct. 27, 2009

(54) PLATINUM-TITANIUM-TUNGSTEN FUEL CELL CATALYST

(75) Inventors: Qun Fan, Fremont, CA (US); Peter Strasser, Houston, TX (US); Alexander Gorer, San Jose, CA (US); Martin Devenney, Mountain View, CA (US); Ting He, Dublin, OH (US); Hiroyuki Oyanagi, Saitama (JP); Daniel M. Giaquinta, Saratoga, CA (US); Kenta Urata, Utsunomiya (JP); Hiroichi Fukuda, Utsunomiya (JP); Konstantinos Chondroudis, Thessaloniki (GR); Keith James Cendak, San Mateo, CA (US)

(73) Assignees: Symyx Technologies, Inc., Santa Clara, CA (US); Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 363 days.

(21) Appl. No.: 10/559,720

(22) PCT Filed: Jun. 7, 2004

(86) PCT No.: PCT/US2004/017876

§ 371 (c)(1),
(2), (4) Date: Jun. 16, 2006

(87) PCT Pub. No.: WO2004/109829

PCT Pub. Date: Dec. 16, 2004

(65) Prior Publication Data

US 2007/0042259 A1   Feb. 22, 2007

Related U.S. Application Data

(60) Provisional application No. 60/476,395, filed on Jun. 6, 2003.

(51) Int. Cl.
| | |
|---|---|
| B01J 21/18 | (2006.01) |
| B01J 23/00 | (2006.01) |
| B01J 23/40 | (2006.01) |
| B01J 23/42 | (2006.01) |
| C22C 14/00 | (2006.01) |
| C22C 27/04 | (2006.01) |
| C22C 27/00 | (2006.01) |
| C22C 32/00 | (2006.01) |
| C22C 5/04 | (2006.01) |
| H01M 4/00 | (2006.01) |

(52) U.S. Cl. .................. 502/313; 502/308; 502/309; 502/326; 502/334; 502/180; 502/182; 502/185; 429/40; 429/41; 429/42; 429/43; 429/44; 420/417; 420/430; 420/432; 420/466

(58) Field of Classification Search .............. 502/308, 502/309, 313, 326, 334, 180, 182, 185; 420/417, 420/430, 432, 466; 429/40–44
See application file for complete search history.

(56) References Cited

U.S. PATENT DOCUMENTS 3,129,163 A * 4/1964 Stern et al. ............. 204/290.12

(Continued)

FOREIGN PATENT DOCUMENTS

BE       895 174 A       5/1983

(Continued)

OTHER PUBLICATIONS

Written Opinion for PCT/US04/17876.*

(Continued)

*Primary Examiner*—Patricia L Hailey
(74) *Attorney, Agent, or Firm*—Senniger Powers

(57) ABSTRACT

A fuel cell catalyst comprising platinum, titanium and tungsten. In one or more embodiments, the concentration of platinum is less than 60 atomic percent, and/or the concentration of titanium is at least 20 atomic percent, and/or the concentration of tungsten is at least 25 atomic percent.

32 Claims, 3 Drawing Sheets

U.S. PATENT DOCUMENTS

| | | | | |
|---|---|---|---|---|
| 3,274,031 | A | * | 9/1966 | Maget et al. .................. 429/42 |
| 3,510,356 | A | | 5/1970 | Richman |
| 3,711,385 | A | | 1/1973 | Beer et al. |
| 3,751,296 | A | | 8/1973 | Beer |
| 4,061,495 | A | | 12/1977 | Selman et al. |
| 4,139,373 | A | * | 2/1979 | Notton ....................... 420/417 |
| 4,261,742 | A | | 4/1981 | Coupland et al. |
| 4,560,454 | A | * | 12/1985 | Harris et al. ................. 205/474 |
| 4,677,035 | A | | 6/1987 | Fiedler et al. |
| 4,683,119 | A | | 7/1987 | Selman et al. |
| 4,737,205 | A | | 4/1988 | Selman et al. |
| 4,781,803 | A | * | 11/1988 | Harris et al. ................. 205/636 |
| 4,859,415 | A | * | 8/1989 | Shida et al. ................. 420/417 |
| 4,885,216 | A | | 12/1989 | Naik |
| 5,068,161 | A | | 11/1991 | Keck et al. |
| 5,074,907 | A | * | 12/1991 | Amato et al. ................. 419/19 |
| 5,077,141 | A | | 12/1991 | Naik et al. |
| 5,126,216 | A | | 6/1992 | Capuano et al. |
| 5,516,381 | A | | 5/1996 | Kawai et al. |
| 5,876,867 | A | | 3/1999 | Itoh et al. |
| 5,939,220 | A | | 8/1999 | Gunner et al. |
| 6,036,791 | A | | 3/2000 | Mitsuhashi et al. |
| 6,045,671 | A | | 4/2000 | Wu et al. |
| 6,048,633 | A | | 4/2000 | Fuji et al. |
| 6,127,058 | A | | 10/2000 | Pratt et al. |
| 6,187,164 | B1 | | 2/2001 | Warren et al. |
| 6,187,468 | B1 | | 2/2001 | Shinkai et al. |
| 6,225,011 | B1 | | 5/2001 | Gotoh et al. |
| 6,268,077 | B1 | | 7/2001 | Kelley et al. |
| 6,294,280 | B1 | | 9/2001 | Tanaka et al. |
| 6,322,643 | B1 | | 11/2001 | Mitsuhashi et al. |
| 6,632,299 | B1 | | 10/2003 | Harris |
| 6,730,350 | B2 | | 5/2004 | Finkelshtain et al. |
| 2002/0004453 | A1 | | 1/2002 | Haugen et al. |
| 2004/0142230 | A1 | | 7/2004 | Katori et al. |

FOREIGN PATENT DOCUMENTS

| | | | |
|---|---|---|---|
| EP | 164200 A1 | * | 12/1985 |
| EP | 0855 449 A | | 7/1998 |
| EP | 1080435 B1 | | 3/2001 |
| GB | 2 029 857 A | | 3/1980 |
| GB | 2 033 925 A | | 5/1980 |
| JP | 62 107040 A | | 5/1987 |
| JP | 63 149356 A | | 6/1988 |
| JP | 01 021030 A | | 1/1989 |
| JP | 04 066632 A | | 3/1992 |
| JP | 04 066635 A | | 3/1992 |
| JP | 04 072029 A | | 3/1992 |
| JP | 06 065601 A | | 3/1994 |
| JP | 07 050008 A | | 2/1995 |
| JP | 08 100255 A | | 4/1996 |
| JP | 2001 294959 A | | 10/2001 |
| JP | 2003-80085 | | 3/2003 |
| WO | WO 99/16137 | | 4/1999 |
| WO | WO 00/35037 A | | 6/2000 |
| WO | WO 02/22901 A | | 3/2002 |
| WO | 2004/109829 | * | 12/2004 |

OTHER PUBLICATIONS

Chu, D. et al.—J. Electrochem. Soc. 1996, 143, 1685.

Coupeland et al.—Platinum Metals Review, vol. 26, No. 4, 1982, pp. 146-157.

Dae-Hee Ye et al.—Korean Journal of Materials Research, vol. 12, No. 12, 2002, pp. 897-903.

Ralph, T.R. et al.—Catalysts for Low Temperature Fuel Cells Part 1: The Cathode Challenges, Platinum Metals Rev., 2002, 46, (1), pp. 3-14.

Schmidt et al.—Rotating disk electrode measurements on the CO tolerance of a high-surface area Pt/Vulcan carbon fuel cell electrocatalyst, Journal of the Electrochemical Society, 1999, 146(4), pp. 1296-1304.

Schmidt et al.—Characterization of high-surface-area electrocatalysts using a rotating disk electrode configuration, Journal of the Electrochemical Society, 1998, 145(7), pp. 2354-2358.

Strasser P. et al.—Combinatorial Electrochemical Strategies For the Discovery of New Fuel-Cell Electrode Materials, Proceedings of the International Symposium on Fuel Cells for Vehicles, 41st Battery Symposium, The Electrochemical Society of Japan, Nagoya 2000, pp. 34-35.

Strasser, P. et al.—Combinatorial Electrochemical Techniques for the Discovery of New Fuel-Cell Cathode Materials, 2001, vol. 2001-4, Direct Methanol Fuel Cells, Proceedings of the Electrochemical Society, New Jersey, Zawodzinski, T., eds, pp. 191-208.

International Search Report for Application No. PCT/US2004/017876 dated Oct. 29, 2004, 7 pages.

Yasuda et al., Polymerization-Pressure Dependencies of Properties of Perfluorosulfonate Cation-Exchanger Thin Films by Plasma Polymerization, Ber. Bunsenges. Phys. Chem. 98, No. 4, 1994, pp. 631-635.

* cited by examiner

PLATINUM-TITANIUM-TUNGSTEN FUEL CELL CATALYST

CROSS-REFERENCE TO RELATED APPLICATIONS

This application is a 35 U.S.C. §371 application of PCT/US2004/017876, filed on Jun. 7, 2004, which claims priority from U.S. Provisional Patent Application Ser. No. 60/476,395, filed Jun. 6, 2003. The entire contents of these related applications are herby incorporated by reference herein.

BACKGROUND OF THE INVENTION

1. Field of the Invention

The present invention relates to catalysts which are useful in fuel cell electrodes (e.g., electrocatalysts) and other catalytic structures, and which comprise platinum, titanium and tungsten.

2. Description of Related Technology

A fuel cell is an electrochemical device for directly converting the chemical energy generated from an oxidation-reduction reaction of a fuel such as hydrogen or hydrocarbon-based fuels and an oxidizer such as oxygen gas (in air) supplied thereto into a low-voltage direct current. Thus, fuel cells chemically combine the molecules of a fuel and an oxidizer without burning, dispensing with the inefficiencies and pollution of traditional combustion.

A fuel cell is generally comprised of a fuel electrode (anode), an oxidizer electrode (cathode), an electrolyte interposed between the electrodes (alkaline or acidic), and means for separately supplying a stream of fuel and a stream of oxidizer to the anode and the cathode, respectively. In operation, fuel supplied to the anode is oxidized, releasing electrons that are conducted via an external circuit to the cathode. At the cathode, the supplied electrons are consumed when the oxidizer is reduced. The current flowing through the external circuit can be made to do useful work.

There are several types of fuel cells, including those having electrolytes of phosphoric acid, molten carbonate, solid oxide, potassium hydroxide, or a proton exchange membrane. A phosphoric acid fuel cell operates at about 160-220° C., and preferably at about 190-200° C. This type of fuel cell is currently being used for multi-megawatt utility power generation and for co-generation systems (i.e., combined heat and power generation) in the 50 to several hundred kilowatts range. In contrast, proton exchange membrane fuel cells use a solid proton-conducting polymer membrane as the electrolyte. Typically, the polymer membrane is maintained in a hydrated form during operation in order to prevent loss of ionic conduction which limits the operation temperature typically to between about 70 and about 120° C. depending on the operating pressure, and preferably below about 100° C. Proton exchange membrane fuel cells have a much higher power density than liquid electrolyte fuel cells (e.g., phosphoric acid), and can vary output quickly to meet shifts in power demand. Thus, they are suited for applications such as in automobiles and small-scale residential power generation where quick startup is a consideration.

In some applications (e.g., automotive), pure hydrogen gas is the optimum fuel; however, in other applications where a lower operational cost is desirable, a reformed hydrogen-containing gas is an appropriate fuel. A reformed-hydrogen containing gas is produced, for example, by steam-reforming methanol and water at 200-300° C. to a hydrogen-rich fuel gas containing carbon dioxide. Theoretically, the reformate gas consists of 75 vol % hydrogen and 25 vol % carbon dioxide. In practice, however, this gas also contains nitrogen, oxygen and, depending on the degree of purity, varying amounts of carbon monoxide (up to 1 vol %). Although some electronic devices also reform liquid fuel to hydrogen, in some applications the conversion of a liquid fuel directly into electricity is desirable, as then high storage density and system simplicity are combined. In particular, methanol is an especially desirable fuel because it has a high energy density, a low cost, and is produced from renewable resources.

For the oxidation and reduction reactions in a fuel cell to proceed at useful rates, especially at operating temperatures below about 300° C., electrocatalyst materials are typically provided at the electrodes. Initially, fuel cells used electrocatalysts made of a single metal, usually platinum (Pt), palladium (Pd), rhodium (Rh), iridium (Ir), osmium (Os), silver (Ag) or gold (Au), because they are able to withstand the corrosive environment. In general, platinum is considered to be the most efficient and stable single-metal electrocatalyst for fuel cells operating below about 300° C.

While the above-noted elements were first used in fuel cells in metallic powder form, later techniques were developed to disperse these metals over the surface of electrically conductive supports (e.g., carbon black) to increase the surface area of the electrocatalyst. An increase in the surface area of the electrocatalyst in turn increased the number of reactive sites, leading to improved efficiency of the cell. Nevertheless, fuel cell performance typically declines over time because the presence of electrolyte, high temperatures and molecular oxygen dissolve the electrocatalyst and/or sinter the dispersed electrocatalyst by surface migration or dissolution/reprecipitation.

Although platinum is considered to be the most efficient and stable single-metal electrocatalyst for fuel cells, it is costly. Additionally, an increase in electrocatalyst activity over platinum is desirable, if not necessary, for wide-scale commercialization of fuel cell technology. However, the development of cathode fuel cell electrocatalyst materials faces longstanding challenges. The greatest challenge is the improvement of the electrode kinetics of the oxygen reduction reaction. In fact, sluggish electrochemical reaction kinetics have prevented attaining the thermodynamic reversible electrode potential for oxygen reduction. This is reflected in exchange current densities of around $10^{-10}$ to $10^{-12}$ $A/cm^2$ for oxygen reduction on, for example, Pt at low and medium temperatures. A factor contributing to this phenomenon includes the fact that the desired reduction of oxygen to water is a four-electron transfer reaction and typically involves breaking a strong O—O bond early in the reaction. In addition, the open circuit voltage is lowered from the thermodynamic potential for oxygen reduction due to the formation of peroxide and possible platinum oxides that inhibit the reaction. A second challenge is the stability of the oxygen electrode (cathode) during long-term operation. Specifically, a fuel cell cathode operates in a regime in which even the most unreactive metals are not completely stable. Thus, alloy compositions that contain non-noble metal elements may have a rate of corrosion that would negatively impact the projected lifetime of a fuel cell. The corrosion may be more severe when the cell is operating near open circuit conditions (which is the most desirable potential for thermodynamic efficiency).

Electrocatalyst materials at the anode also face challenges during fuel cell operation. Specifically, as the concentration of carbon monoxide (CO) rises above about 10 ppm in the fuel the surface of the electrocatalyst can be rapidly poisoned. As a result, platinum (by itself) is a poor electrocatalyst if the fuel stream contains carbon monoxide (e.g., reformed-hydrogen gas typically exceeds 100 ppm). Liquid hydrocarbon-based fuels (e.g., methanol) present an even greater poisoning problem. Specifically, the surface of the platinum becomes blocked with the adsorbed intermediate, carbon monoxide (CO). It has been reported that $H_2O$ plays a key role in the removal of such poisoning species in accordance with the following reactions:

$$Pt+CH_3OH \rightarrow Pt-CO+4H^++4e^- \quad (1);$$

$$Pt+H_2O \rightarrow Pt-OH+H^++e^- \quad (2);$$

and $$Pt-CO+Pt-OH \rightarrow 2Pt+CO_2+H^++e^- \quad (3).$$

As indicated by the foregoing reactions, the methanol is adsorbed and partially oxidized by platinum on the surface of the electrode (1). Adsorbed OH, from the hydrolysis of water, reacts with the adsorbed CO to produce carbon dioxide and a proton (2,3). However, platinum does not form OH species well at the potentials fuel cell electrodes operate (e.g., 200 mV–1.5 V). As a result, step (3) is the slowest step in the sequence, limiting the rate of CO removal, thereby allowing poisoning of the electrocatalyst to occur. This applies in particular to a proton exchange membrane fuel cell which is especially sensitive to CO poisoning because of its low operating temperatures.

One technique for increasing electrocatalytic cathodic activity during the reduction of oxygen and electrocatalytic anodic activity during the oxidation of hydrogen is to employ an electrocatalyst which is more active, corrosion resistant, and/or more poison tolerant. For example, increased tolerance to CO has been reported by alloying platinum and ruthenium at a 50:50 atomic ratio (see, D. Chu and S. Gillman, J. Electrochem. Soc. 1996, 143, 1685). The electrocatalysts proposed to date, however, leave room for further improvement.

BRIEF SUMMARY OF THE INVENTION

Briefly, therefore, the present invention is directed to a catalyst for use in oxidation or reduction reactions, the catalyst comprising platinum at a concentration that is no more than 60 atomic percent, titanium, and tungsten.

The present invention is also directed to a catalyst for use in oxidation or reduction reactions, the catalyst comprising platinum, titanium at a concentration of at least 20 atomic percent, and tungsten.

Additionally, the present invention is directed to a catalyst for use in oxidation or reduction reactions, the catalyst comprising platinum, titanium, and tungsten, wherein the concentration of tungsten is at least 25 atomic percent.

The present invention is also directed to a catalyst for use in oxidation or reduction reactions, the catalyst comprising platinum, titanium at a concentration that is between about 2 and about 12 atomic percent, and tungsten.

Additionally, the present invention is directed to a catalyst for use in oxidation or reduction reactions, the catalyst comprising platinum, titanium, and tungsten at a concentration that is between about 2 and about 12 atomic percent.

The present invention is also directed to a supported electrocatalyst powder for use in electrochemical reactor devices, the supported electrocatalyst powder comprising one of the foregoing catalysts and electrically conductive support particles upon which the catalyst is dispersed.

The present invention is also directed to one or more of the foregoing catalysts wherein said catalyst comprises an alloy of the recited metals, or alternatively wherein said catalyst consists essentially of an alloy of the recited metals.

Further, the present invention is directed to a supported electrocatalyst comprising an electrically conductive support and an alloy on the electrically conductive support wherein the alloy comprises one of the foregoing catalysts.

The present invention is also directed to a fuel cell electrode, the fuel cell electrode comprising electrocatalyst particles and an electrode substrate upon which the electrocatalyst particles are deposited, the electrocatalyst particles comprising one of the foregoing catalysts.

The present invention is also directed to a fuel cell comprising an anode, a cathode, a proton exchange membrane between the anode and the cathode, and one of the foregoing catalysts for the catalytic oxidation of a hydrogen-containing fuel or the catalytic reduction of oxygen.

The present invention is also directed to a method for the electrochemical conversion of a hydrogen-containing fuel and oxygen to reaction products and electricity in a fuel cell comprising an anode, a cathode, a proton exchange membrane therebetween, one of the foregoing catalysts, and an electrically conductive external circuit connecting the anode and cathode, the method comprising contacting the hydrogen-containing fuel or the oxygen and the catalyst to catalytically oxidize the hydrogen-containing fuel or catalytically reduce the oxygen.

The present invention is also directed to a fuel cell electrolyte membrane, or a fuel cell electrode, having an unsupported catalyst layer on a surface thereof, said unsupported catalyst layer comprising a catalyst having any one of the foregoing compositions.

The foregoing and other features and advantages of the present invention will become more apparent from the following description and accompanying drawing.

BRIEF DESCRIPTION OF THE DRAWINGS

It is to be noted that corresponding reference characters indicate corresponding parts throughout the drawings.

DETAILED DESCRIPTION OF THE INVENTION

General Discussion

Figure 1:
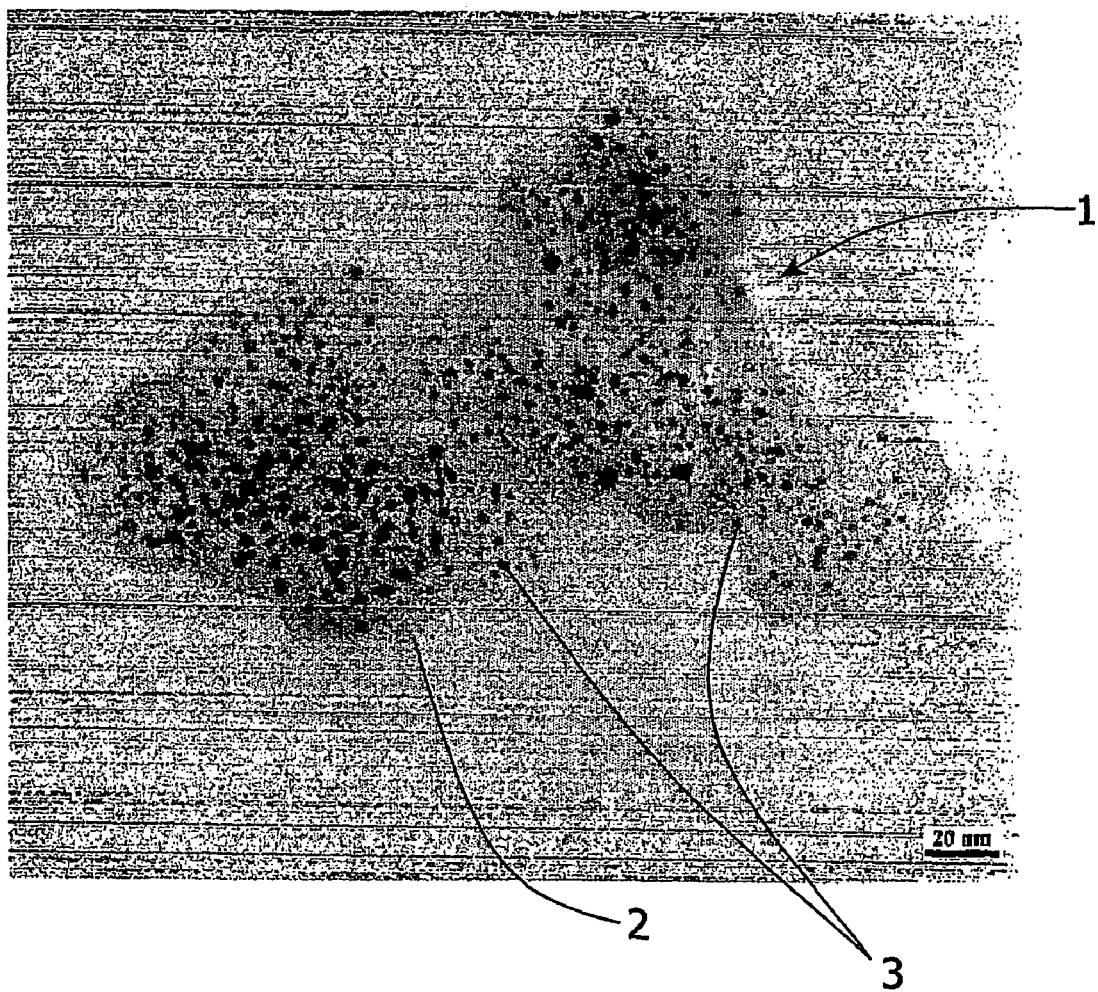
FIG. 1 is a photograph of a TEM image of a carbon support with catalyst nanoparticles deposited thereon, in accordance with the present invention.

The present invention is directed to a metal-containing substance having catalytic activity for use in, for example, polyelectrolyte membrane fuel cell (e.g., an electrocatalyst). In particular, the present invention is directed to a metal-containing substance comprising, as further detailed herein, platinum, titanium and tungsten, which has catalytic activity in oxidation and/or reduction reactions of interest.

In this regard it is to be noted that, in general, it is desirable, but not essential, to reduce the cost of a catalyst to be used in such reactions, particularly when used in a fuel cells. One method of reducing the cost is to decrease the amount of noble metals (such as platinum) used to produce the catalyst. Typically, however, as the concentrations of noble metals are decreased, catalyst compositions tend to become more susceptible to corrosion and/or the absolute activity may be diminished. Thus, it is typically desirable to achieve the most activity per weight percent of noble metals (see, e.g., End Current Density/Weight Fraction of Pt, as set forth in Tables A-D, infra). Preferably, this is accomplished without compromising, for example, the life cycle of the fuel cell in which the catalyst is placed. In addition to, or as an alternative to, reducing cost by limiting the noble metal concentration, a catalyst composition of the present invention may be selected because it represents an improvement in corrosion resistance and/or activity compared to platinum (e.g., at least a 3 times increase in catalytic activity compared to platinum).

The present invention is thus directed to a metal-containing substance that has catalytic activity in an oxidation and/or reduction reaction, and that comprises platinum, titanium and tungsten. Optionally, the catalyst of the present invention may be in the form of an alloy of these metals, the catalyst for example consisting essentially of an alloy of these metals. Alternatively, the catalyst of the present invention may comprise these metals, a portion of which is in the form of an alloy, the catalyst for example having alloy particles inter-mixed with oxide particles as a coating, as a pseudo-support, and/or as a simple mixture.

Furthermore, this catalyst comprises amounts of platinum, titanium and tungsten which are sufficient for the metals, present therein, to play a role in the catalytic activity and/or crystallographic structure of the catalyst. Stated another way, the concentrations of platinum, titanium and tungsten in the present catalyst are such that the presence of the metals would not be considered an impurity therein. For example, when present, the concentrations of each of platinum, titanium and tungsten are at least about 0.1, 0.5, 1, or even 2 atomic percent. Advantageously and surprisingly, it has been discovered that the catalysts of the present invention may exhibit favorable electrocatalytic activity while having reduced amounts of platinum, as compared to, for example, a platinum standard.

It is to be noted that, in one or more embodiments of the present invention, platinum, titanium and/or tungsten are substantially in their metallic oxidation states. Stated another way, the average oxidation state of platinum, titanium and/or tungsten are at or near zero. Although in such embodiments there may be portions of the catalyst wherein the oxidation states of one or more of these catalyst elements or components is greater than zero, the average oxidation state of each of these elements throughout the entire catalyst is less than the lowest commonly occurring oxidation state for that particular element (e.g., the lowest commonly occurring oxidation state for platinum is 2, for titanium is 2, and for tungsten is 2). Therefore, the average oxidation states of the platinum, and/or titanium, and/or tungsten may be, in order of increasing preference, less than about 2, 1.5, 1, 0.5, 0.1, or 0.01, or even zero.

It is to be further noted, however, that in one or more embodiments of the present invention the platinum, titanium and/or tungsten may not be substantially present in their metallic oxidation state. Stated another way, in one or more embodiments of the present invention, the platinum, titanium and/or tungsten present in the catalyst may have an average oxidation state that is greater than zero (the platinum, titanium and/or tungsten being present in the catalyst, for example, as an oxide or as a carbide).

It is to be still further noted that the catalyst may optionally consist essentially of the platinum, titanium, and tungsten (e.g., impurities that play little, if any, role in the catalytic activity and/or crystallographic structure of the catalyst may be present to some degree). Stated another way, the concentration of a metallic or non-metallic element or component of the catalyst, other than platinum, titanium, and tungsten, may optionally not exceed what would be considered an impurity (e.g., less than 1, 0.5, 0.1, 0.01 atomic percent, or less).

Constituent Concentrations

As previously disclosed, the catalyst of the present invention comprises platinum. Preferably, the catalyst comprises at least about 5 atomic percent of platinum. More preferably, the concentration of platinum is at least about 10 atomic percent. Still more preferably, the concentration of platinum is at least about 15 atomic percent. Still more preferably, the concentration of platinum is at least about 20 atomic percent. At the other end of the platinum concentration range, it is generally preferred, in a first embodiment, that the concentration of platinum is no more than about 60 atomic percent. More preferably, the concentration of platinum is no more than about 50 atomic percent. Still more preferably, the concentration of platinum is no more than about 45 atomic percent. Accordingly, the concentration of platinum may be between a minimum platinum concentration and a maximum platinum concentration, wherein the minimum platinum concentration is selected from the group consisting of about 5, 10, 15 and 20 atomic percent, and the maximum platinum concentration is selected from the group consisting of about 60, 50 and 45 atomic percent. Preferably, the concentration of platinum is at least about 5 and no more than about 60 atomic percent. More preferably, the concentration of platinum is between about 10 and about 50 atomic percent. Still more preferably, the concentration of platinum is between about 20 and about 45 atomic percent. It is to be noted, however, that the scope of the present invention is intended to encompass all of the various concentration range permutations possible herein, as well as set forth in detail below.

Like platinum, the concentration of titanium may also be varied widely in the many embodiments disclosed herein. Preferably, the concentration of titanium is at least about 1 atomic percent. More preferably, in a first embodiment, the concentration of titanium is at least about 5 atomic percent. Still more preferably, the concentration of titanium is greater than 10 atomic percent. Still more preferably, the concentration of titanium is greater than 15 atomic percent. Even more preferably, the concentration of titanium is at least about 20 atomic percent. At the other end of titanium concentration range, the titanium concentration is preferably no more than about 80 atomic percent. More preferably, the concentration of titanium is no more than about 55 atomic percent. Still more preferably, the concentration of titanium is no more than about 40 atomic percent. Still more preferably, the concentration of titanium is no more than about 30 atomic percent. Accordingly, the concentration of titanium may be between a minimum titanium concentration and a maximum titanium concentration, wherein the minimum titanium concentration is selected from the group consisting of about 1, 5, 10, 15 and 20 atomic percent, and the maximum titanium concentration is selected from the group consisting of about 80, 55, 40 and 30 atomic percent. Preferably, the concentration of titanium is between about 1 and about 80 atomic percent. More preferably, the concentration of titanium is between about 5 and about 55 atomic percent. Still more preferably, the concentration of titanium is between about 5 and about 40 atomic percent. Still more preferably, the concentration of titanium is between about 10 and about 30 atomic percent.

The concentration of tungsten may also be varied widely in the many embodiments disclosed herein. In a first embodiment, the concentration of tungsten is preferably at least about 5 atomic percent. More preferably, the concentration of tungsten is at least about 10 atomic percent. Still more preferably, the concentration of tungsten is at least about 15 atomic percent. Still more preferably, the concentration of tungsten is at least about 20 atomic percent. Still more preferably, the concentration of tungsten is at least about 25 atomic percent. Even more preferably, the concentration of tungsten is at least about 30 atomic percent. At the other end of tungsten concentration range, the tungsten concentration is preferably no more than about 80 atomic percent. More preferably, the concentration of tungsten is no more than about 60 atomic percent. Still more preferably, the concentration of tungsten is no more than about 55 atomic percent. Still more preferably, the concentration of tungsten is no more than about 40 atomic percent. Accordingly, the concentration of tungsten may be between a minimum tungsten concentration and a maximum tungsten concentration, wherein the minimum tungsten concentration is selected from the group consisting of about 5, 10, 15, 20, 25, and 30 atomic percent, and the maximum tungsten concentration is selected from the group consisting of about 80, 60, 55 and 40 atomic percent. Preferably, the concentration of tungsten is between about 5 and about 80 atomic percent, or between about 10 and about 80 atomic percent. More preferably, the concentration of tungsten is between about 15 and about 60 atomic percent, or between about 20 and about 60 atomic percent. Still more preferably, the concentration of tungsten is between about 30 and about 55 atomic percent, or between about 30 and about 40 atomic percent.

It is to be further noted that the metal-containing substance of the present invention may encompass any of the various combinations of platinum, titanium, and tungsten concentrations and/or ranges of concentrations set forth above without departing from its intended scope. For example, the catalyst may alternatively comprise a concentration of platinum that is between about 5 and 60 atomic percent, a concentration of titanium that is no more than about 80 atomic percent, and a concentration of tungsten that between about 10 and about 80 atomic percent. In a first sub-embodiment, the catalyst may comprise a concentration of platinum that is between about 10 and about 50 atomic percent, a concentration of titanium that is between about 1 and about 55 atomic percent, and a concentration of tungsten that is between about 20 and about 60 atomic percent. In a second sub-embodiment, the catalyst may comprise a concentration of platinum that is between about 20 and about 45 atomic percent, a concentration of titanium that is between about 5 and about 40 atomic percent, and a concentration of tungsten that is between about 30 and about 55 atomic percent.

In another example, the concentration of platinum may be between about 30 and about 50 atomic percent, the concentration of titanium may be less than about 20 atomic percent, and the concentration of tungsten may be between about 40 and about 60 atomic percent. In a sub-embodiment, the concentration of platinum may be between about 35 and about 45 atomic percent, the concentration of titanium may be between about 5 and about 15 atomic percent, and the concentration of tungsten may be between about 45 and about 55 atomic percent.

In yet another example, the concentration of platinum may be between about 20 and about 40 atomic percent, the concentration of titanium may be between about 25 and about 45 atomic percent, and the concentration of tungsten may be between about 30 and about 50 atomic percent. In a sub-embodiment, the concentration of platinum may be between about 25 and about 35 atomic percent, the concentration of titanium may be between about 30 and about 40 atomic percent, and the concentration of tungsten may be between about 35 and about 45 atomic percent.

In yet another example, the concentration of platinum may be between about 10 and about 50 atomic percent, the concentration of titanium may be between about 30 and about 80 atomic percent, and the concentration of tungsten may be less than about 25 atomic percent. In a sub-embodiment, the concentration of platinum may be between about 15 and about 45 atomic percent, the concentration of titanium may be between about 40 and about 75 atomic percent, and the concentration of tungsten may be between about 5 and about 20 atomic percent. In another sub-embodiment, the concentration of platinum may be between about 20 and about 40 atomic percent, the concentration of titanium may be between about 50 and about 65 atomic percent, and the concentration of tungsten may be between about 5 and about 15 atomic percent.

It is to be further noted, however, that in an alternative embodiment of the present invention the platinum concentration may be in excess of about 60 atomic percent (e.g., about 65 atomic percent, about 70 atomic percent, about 75 atomic percent, about 80 atomic percent, about 85 atomic percent or more). For example, the platinum concentration may be in excess of about 60, 65 or even 70 atomic percent (the concentration ranging for example from about 70 to about 85 atomic percent, or about 70 to about 75 atomic percent), while the concentration of tungsten is less than about 15 atomic percent (the concentration ranging for example from about 2 to about 12 atomic percent, or from about 5 to about 10 atomic percent), and/or the concentration of titanium is less than about 12 atomic percent (the concentration ranging for example from about 2 to about 12 atomic percent, or from about 5 to about 10 atomic percent).

It is to be still further noted that the catalyst of the present invention may consist essentially of platinum, titanium and tungsten, the concentrations of the metals being within any one or more of the foregoing ranges for an individual metal or for the combination of metals. However, in some embodiments it is possible that the catalyst of the present invention may comprise platinum, titantium, and tungsten, as well as other constituents, including for example platinum, titanium and/or tungsten oxides and/or carbides. It is therefore to be noted that in some embodiments the total concentration of platinum, titanium and tungsten may be less than about 100 percent of the metal atoms present therein; for example, the total concentration of platinum, titanium and tungsten may be less than about 100 atomic percent but at least about 70, about 75, about 80, about 85, about 90, about 95, or about 99 atomic percent of the catalyst.

It is to be further noted that the foregoing compositions of the present invention are for the overall stoichiometries, or bulk stoichiometries, of a prepared catalyst prior to being subjected to an electrocatalytic reaction. That is, a reported catalyst composition (e.g., a catalyst comprising or consisting essentially of an alloy) is an average stoichiometry over the entire volume of the prepared catalyst composition, and therefore, localized stoichiometric variations may exist. For example, the volume of a particle of a catalyst comprising the surface and the first few atomic layers inward therefrom may differ from the bulk stoichiometry. Likewise, within the bulk of the particle there may be stoichiometric variations. The surface stoichiometry corresponding to a particular bulk stoichiometry is highly dependant upon the method and conditions under which the catalyst is prepared. As such, catalyst having the same bulk stoichiometry may have significantly different surface stoichiometries. Without being bound to a particular theory, it is believed the differing surface stoichiometries are due at least in part to differences in the atomic arrangements, chemical phases and homogeneity of the catalysts.

Furthermore, it is to be noted that it has been reported that subjecting a catalyst composition to an electrocatalytic reaction (e.g., the operation of a fuel cell) may change the composition by leaching one or more constituents from the catalyst (see, Catalysis for Low Temperature Fuel Cells Part 1: The Cathode Challenges, T. R. Ralph and M. P. Hogarth, Platinum Metals Rev., 2002, 46, (1), p. 3-14). This leaching effect may potentially act to increase the activity of the catalyst by increasing the surface area and/or by changing the surface composition of the catalyst. In fact, the purposeful leaching of catalyst compositions after synthesis to increase the surface area has been disclosed by Itoh et al. (see, e.g., U.S. Pat. No. 5,876,867). As such, it is to be noted that the catalyst compositions of the present invention are intended to include starting bulk stoichiometries, any starting surface stoichiometries resulting therefrom, and modifications of the starting bulk and/or surface stoichiometries that are produced by subjecting the catalyst to an electrocatalytic reaction.

Formation of a Catalyst Comprising/Consisting Essentially of an Alloy

The catalysts of the present invention may consist essentially of an alloy of platinum, titanium and tungsten. Alternatively, the catalysts of the present invention may comprise an alloy of platinum, titanium and tungsten; that is, the catalysts of the present invention may alternatively comprise an alloy of these metals, and optionally one or more of these metals in a non-alloy form (e.g., a platinum, titanium and/or tungsten salt and/or oxide and/or carbide).

Such alloys may be formed by a variety of methods. For example, the appropriate amounts of the constituents (e.g., metals) may be mixed together and heated to a temperature above the respective melting points to form a molten solution of the metals that is cooled and allowed to solidify.

Typically, the catalysts of the present invention are used in a powder form to increase the surface area, which in turn increases the number of reactive sites, and thus leads to improved efficiency of the cell in which the catalysts are being used. Thus, a formed catalyst alloy may be transformed into a powder after being solidified (e.g., by grinding), or during solidification (e.g., spraying molten alloy and allowing the droplets to solidify). In this regard it is to be noted, however, that in some instances it may be advantageous to evaluate alloys for electrocatalytic activity in a non-powder form, as further described and illustrated elsewhere herein (see, e.g., Examples 1 and 2, infra).

To further increase surface area and efficiency, a catalyst alloy (i.e., a catalyst comprising or consisting essentially of an alloy) for use in a fuel cell may be deposited over the surface of electrically conductive supports (e.g., carbon black). One method for loading a catalyst alloy onto supports typically comprises depositing metal precursor compounds onto the supports, and converting the precursor compounds to metallic form and alloying the metals using a heat-treatment in a reducing atmosphere (e.g., an atmosphere comprising an inert gas such as argon and/or a reducing gas such as hydrogen). One method for depositing the precursor compounds involves chemical precipitation of precursor compounds onto the supports. The chemical precipitation method is typically accomplished by mixing supports and sources of the precursor compounds (e.g., an aqueous solution comprising one or more inorganic metal salts) at a concentration sufficient to obtain the desired loading of the catalyst on the supports, after which precipitation of the precursor compounds is initiated (e.g., by adding an ammonium hydroxide solution). The slurry is then typically filtered from the liquid under vacuum, washed with deionized water, and dried to yield a powder that comprises the precursor compounds on the supports.

Another method for depositing the precursor compounds comprises forming a suspension comprising a solution and supports suspended therein, wherein the solution comprises a solvent portion and a solute portion that comprises the constituents of the precursor compound(s) being deposited. The suspension is frozen to deposit (e.g., precipitate) the precursor compound(s) on the support particles. The frozen suspension is freeze-dried to remove the solvent portion and leave a freeze-dried powder comprising the supports and the deposits of the precursor compound(s) on the supports.

Since the process may involve sublimation of the solvent portion from the frozen suspension, the solvent portion of the solution in which the supports are suspended preferably has an appreciable vapor pressure below its freezing point. Examples of such sublimable solvents that also dissolve many metal-containing compounds and metals include water, alcohols (e.g., methanol, ethanol, etc.), acetic acid, carbon tetrachloride, ammonia, 1,2-dichloroethane, N,N-dimethylformamide, formamide, etc.

The solution in which the supports are dispersed/suspended provides the means for delivering the metal species which is to be deposited onto the surfaces of the supports. The metal species may be the final desired form, but in many instances it is not. If the metal species is not a final desired form, the deposited metal species is a precursor of the final desired form. Examples of such precursors or metal species include inorganic and organic metal compounds such as metal halides, sulfates, carbonates, nitrates, nitrites, oxalates, acetates, formates, etc. The conversion to the final desired form may be made by thermal decomposition, chemical reduction, or other reaction. Thermal decomposition, for example, is brought about by heating a precursor to obtain a different solid material and a gaseous material. In general, as is known, thermal decomposition of halides, sulfates, carbonates, nitrates, nitrites, oxalates, acetates, and formates may be carried out at temperatures between about 200 and about 1,200° C.

A precursor is usually selected such that any unwanted by-products from the conversion can be removed from the powder product. For example, during thermal decomposition the unwanted decomposition products are typically volatilized. To yield a final product that is an electrocatalyst metal alloy, the metal precursors are typically selected so that the powder comprising the deposited precursors may be reduced without significantly altering the uniformity of the metal deposits on the surface of the supports and/or without significantly altering the particle size of the final powder (e.g., through agglomeration).

Nearly any metal may be deposited onto supports one or more of the processes noted herein, provided that the metal or compound containing the metal is capable of being dissolved in a suitable medium (i.e., a solvent). Likewise, nearly any metal may be combined with, or alloyed with, any other metal provided the metals or metal-containing compounds are soluble in a suitable medium.

The solute portion may comprise an organometallic compound and/or an inorganic metal-containing compound as a source of the metal species being deposited. In general, organometallic compounds are more costly, may contain more impurities than inorganic metal-containing compounds, and may require organic solvents. Organic solvents are more costly than water and typically require procedures and/or treatments to control purity or negate toxicity. As such, organometallic compounds and organic solvents are generally not preferred. Examples of appropriate inorganic salts include $(NH_4)_2TiO(C_2O_4)2.H_2O$ and $(NH_4)_{10}W_{12}O_{41}.5H_2O$. Such salts are highly soluble in water and, as such, water is a preferred solvent. In some instances, it is desirable for an inorganic metal-containing compound to be dissolved in an acidic solution prior to being mixed with other inorganic metal-containing compounds.

To form a catalyst alloy having a particular composition or stoichiometry, the amounts of the various metal-containing source compounds necessary to achieve that composition are determined in view thereof. If the supports have a pre-deposited metal, the loading of the pre-deposited metal on the supports is typically taken into account when calculating the necessary amounts of metal-containing source compounds. After the appropriate amounts of the metal-containing compounds are determined, the solution may be prepared by any appropriate method. For example, if all the selected metal-containing source compounds are soluble at the desired concentration in the same solvent at room temperature, they may merely be mixed with the solvent. Alternatively, the suspending solution may be formed by mixing source solutions, wherein a source solution comprises a particular metal-containing source compound at a particular concentration. If, however, all the selected compounds are not soluble at the same temperature when mixed together (either as powders into the solvent or as source solutions), the temperature of the mixture may be increased to increase the solubility limit of one or more of the source compounds so that the suspending solution may be formed. In addition to adjusting solubility with temperature, the stability of the suspending solution may be adjusted, for example, by the addition of a buffer, by the addition of a complexing agent, and/or by adjusting the pH.

In addition to varying the amounts of the various metals to form alloys having different compositions, this method allows for a wide variation in the loading of the metal onto the supports. This is beneficial because it allows for the electrocatalytic activity of a supported catalyst alloy powder (e.g., an electrocatalyst powder) to be maximized. The loading is controlled in part by adjusting the total concentration of the various metals in the solution while maintaining the relative amounts of the various metals. In fact, the concentrations of the inorganic metal-containing compounds may approach the solubility limit for the solution. Typically, however, the total concentration of inorganic metal-containing compounds in the solution is between about 0.01 and about 5 M which is well below the solubility limit. In one embodiment, the total concentration of inorganic metal-containing compounds in the solution is between about 0.1 and about 1 M. Concentrations below the solubility limit are used because it is desirable to maximize the loading of the supported metal alloy electrocatalysts without decreasing the surface area of the metal deposits. Depending, for example, on the particular composition, the size of the deposits, and the uniformity of the deposit distribution on the supports, this maximized condition is typically achieved at a loading between about 5 and about 60 weight percent. In one embodiment the loading is between about 15 and about 45 or about 55 weight percent, or between about 20 and about 40 or about 50 weight percent. In another embodiment the loading is about 20 weight percent, about 40 weight percent, or about 50 weight percent.

The supports upon which the metal species (e.g., metal-containing compound) is to be deposited may be of any size and composition that is capable of being dispersed/suspended in the solution during the removal of heat to precipitate the metal species. The maximum size depends on several parameters including agitation of the suspension, density of the supports, specific gravity of the solution, and the rate at which heat is removed from the system. In general, the supports are electrically conductive and are useful for supporting catalytic compounds in fuel cells. Such electrically conductive supports are typically inorganic, for example, carbon supports. However, the electrically conductive supports may comprise an organic material such as an electrically conductive polymer (see, e.g., in U.S. Pat. No. 6,730,350). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. Carbon black support particles may have a Brunauer, Emmett and Teller (BET) surface area up to about 2000 $m^2/g$. It has been reported that satisfactory results are achieved using carbon black support particles having a high mesoporous area, e.g., greater than about 75 $m^2/g$ (see, e.g., Catalysis for Low Temperature Fuel Cells Part 1: The Cathode Challenges, T. R. Ralph and M. P. Hogarth, Platinum Metals Rev., 2002, 46, (1), p. 3-14). Experimental results to date indicate that a surface area of about 500 $m^2/g$ is preferred.

In another embodiment the supports have pre-deposited material thereon. For example, when the final composition of the deposits on the carbon supports is a platinum alloy, it may be advantageous to use a carbon supported platinum powder. Such powders are commercially available from companies such as Johnson Matthey, Inc., of New Jersey and E-Tek Div. of De-Nora, N.A., Inc., of Somerset, N.J. and may be selected to have a particular loading of platinum. The amount of platinum loading is selected in order to achieve the desired stoichiometry of the supported metal alloy. Typically, the loading of platinum is between about 5 and about 60 weight percent. In one embodiment the loading of platinum is between about 15 and 45 weight percent. The size (i.e., the maximum cross-sectional length) of the platinum deposits is typically less than about 20 nm. In other embodiments of the invention the size of the platinum deposits is less than about 10 nm, 5 nm, or 2 nm, and may be smaller. In another embodiment of the invention the size of the platinum deposits is between about 2 and about 3 nm. Experimental results to date indicate that a desirable supported platinum powder may be further characterized by having a platinum surface area of between about 150 and about 170 $m^2/g$ (determined by CO adsorption), a combined carbon and platinum surface area between about 350 and about 400 $m^2/g$ (determined by $N_2$ adsorption), and an average support size that is between about 100 and 300 nm.

The solution and supports are mixed according to any appropriate method to form the dispersion/suspension. Exemplary methods include magnetic stirring, insertion of a stirring structure or apparatus such as a rotor, shaking, sonication, or a combination of the foregoing methods. Provided that the supports can be adequately mixed with the solution, the relative amounts of supports and solution may vary over a wide range. For example, when preparing carbon supported electrocatalysts using an aqueous suspension comprising dissolved inorganic metal-containing compounds, the carbon supports typically comprise between about 1 and about 30 weight percent of the suspension. In other embodiments the carbon supports comprise between about 1 and about 15 weight percent of the suspension, between about 1 and about 10 weight percent of the suspension, between about 3 and about 8 weight percent of the suspension, between about 5 and about 7 weight percent of the suspension, or about 6 weight percent of the suspension.

The relative amounts of supports and solution may also be described in terms of volume ratios. In one embodiment the dispersion/suspension has a volume ratio of support particles to solution of at least about 1:10. Specifying a minimum volume ratio indicates that the volume of support particles may be increased relative to the volume of solution. In other embodiments the volume ratio is at least about 1:8, 1:5, and 1:2.

In one method of preparation, the solution and supports described or illustrated herein are mixed using sonication at a power and for a duration sufficient to form a dispersion/suspension in which the pores of the supports are impregnated with the solution and/or the supports are uniformly distributed throughout the solution. If the suspension is not uniformly mixed (i.e., the supports are not uniformly impregnated with the solution and/or the supports are not uniformly distributed throughout the solution), the deposits formed on the supports will typically be non-uniform (e.g., the loading of the metal species may vary among the supports, the size of the deposits may vary significantly on a support and/or among the supports, and/or the composition of the deposits may vary among the supports). Although a uniform mixture is generally preferred, there may be circumstances in which a non-uniform mixture is desirable.

When a freeze-drying method of preparation is employed, typically the uniformity of the suspension is maintained throughout the removal of heat from the suspension. This uniformity may be maintained by continuing the mixing of the suspension as it is being cooled. In one embodiment, however, the uniformity is maintained by the viscosity of the dispersion/suspension. The actual viscosity needed to suspend the support particles uniformly depends in large part on the amount of support particles in the dispersion/suspension and the size of the support particles. To a lesser degree, the necessary viscosity depends on the density of the supports and the specific gravity of the solution. In general, it is typically sufficient to prevent substantial settling of the supports as the heat is being removed from the suspension to precipitate the deposits, and in one embodiment until the dispersion/suspension is frozen. The degree of settling, if any, may be determined, for example, by examining portions of the frozen suspension. Typically, substantial settling would be considered to have occurred if the concentrations of supports in any two portions vary by more than about ±10%. When preparing a carbon-support catalyst powder in accordance with the freeze-drying method, the viscosity is typically sufficient to prevent settling for at least about 4 minutes. In other embodiments the viscosity prevents settling for at least about 10 minutes, about 30 minutes, about 1 hour, and even up to about 2 days. In another embodiment the viscosity of the dispersion/suspension is at least about 5,000 mPa·s.

Heat is removed from the dispersion/suspension so that at least a part of the solute portion separates from the solvent portion and deposits (e.g., precipitates) the metal species onto the supports and/or onto any pre-existing deposits (e.g., pre-deposited platinum or deposits formed by precipitation of incompatible solutes). If the concentration of supports in the suspension is sufficient (e.g., within the ranges set forth above) and enough heat is removed, nearly all of the metal species to be deposited is separated from the solvent portion to form deposits (e.g., precipitates) comprising the metal species on the supports. In one embodiment the heat is removed to freeze the dispersion/suspension and form a composite comprising the supports with deposits comprising the metal species on the supports within a matrix of the solvent portion in a solid state. If the concentration of the solute portion in the solution exceeds the ability of the supports to accommodate deposits of the metal species, some of the solute portion may crystallize within the matrix. If this occurs, such crystals are not considered to be a supported powder.

In one embodiment of the present invention, the deposits of metal species are precursors of a catalyst alloy and the size of the metal species deposits is controlled such that the eventually formed alloy deposits are of size suitable for use as a fuel cell catalyst (e.g., 20 nm, 10 nm, 5 nm, 3 nm (30 Å), 2 nm (20 Å) or smaller). As set forth above, this may be accomplished in part by maintaining a well impregnated and uniformly distributed suspension throughout the removal of heat from the system. Additionally, this may be accomplished by rapidly removing heat from the dispersion/suspension as the compound or compounds are depositing on supports.

The rapid heat removal may be accomplished by cooling the suspension from a temperature of at least about 20° C. to a temperature below the freezing point of the solvent (e.g., at a rate of at least about 20° C./minute). In one embodiment the suspension is cooled at a rate of at least about 50° C./minute. In another embodiment the suspension is cooled at a rate between about 50 and 100° C./minute. Typically, such cooling rates freeze the suspension from a temperature such as room temperature (about 20° C.) or higher (e.g., about 100° C.) within a freezing period of not more than about 10, 5, or 3 minutes.

The heat may be removed from the dispersion/suspension by any appropriate method. For example, a container containing a volume of dispersion/suspension may be placed within a refrigeration unit such as freeze-dryer, a volume of dispersion/suspension may be contacted with a cooled surface (e.g., a plate or container), a volume of dispersion/suspension in a container may be immersed in, or otherwise contacted with, a cryogenic liquid. Advantageously, the same container may also be used during the formation of the dispersion and/or during the separation of solvent from deposited supports. In one embodiment a cover is placed over an opening of the container. Although the cover may completely prevent the escape of any solid matter from the container, in one embodiment the cover allows for a gas to exit the container and substantially prevents the supports from exiting the container. An example of such a cover includes a stretchable film (e.g., PARAFILM) having holes that are, for example, less than about 500 μm in size (maximum length across the hole).

In one embodiment the dispersion/suspension is cooled at a rate of at least about 20° C./minute by immersing a container containing the dispersion/suspension in a volume of cryogenic liquid within a cryogenic container sized and shaped so that at least about 50, 60, 70, 80, or 90 percent of the surface of the dispersion/suspension container is contacted with the cryogenic liquid. The cryogenic liquid is typically at a temperature that is at least about 20° C. below the freezing point of the solvent. Examples of suitable cryogenic liquids typically include liquid nitrogen, liquid helium, liquid argon, but even less costly media may be utilized (for example, an ice water/hydrous calcium chloride mixture can reach temperatures down to about −55° C., an acetone/dry ice mixture can reach temperatures down to about −78° C., and a diethyl ether/dry ice mixture can reach temperatures down to about −100° C.).

The container may be made of nearly any type of material. Generally, the selected material does not require special handling procedures, can withstand repeated uses without structural failure (e.g., resistant to thermal shock), does not contribute impurities to the suspension (e.g., resistant to chemical attack), and is thermally conductive. For example, plastic vials made from high density polyethylene may be used.

The supports having the deposits thereon may be separated from the solvent portion by any appropriate method such as filtration, evaporation (e.g., by spray-drying), sublimation (e.g., freeze-drying), or a combination thereof. The evaporation or sublimation rate may be enhanced by adding heat (e.g., raising the temperature of the solvent) and/or decreasing the atmospheric pressure to which the solvent is exposed.

In one embodiment a frozen suspension is freeze-dried to remove the solvent portion from the frozen suspension. The freeze-drying may be carried out in any appropriate apparatus such as a LABCONCO FREEZE DRY SYSTEM (Model 79480). Intuitively, one of skill in the art would typically maintain the temperature of the frozen suspension below the melting point of the solvent (i.e., the solvent is removed by sublimation) in order to prevent agglomeration of the supports. The freeze-drying process described or illustrated herein may be carried out under such conditions. Surprisingly, however, it is not critical that the solvent portion remain fully frozen. Specifically, it has been discovered that a free-flowing, and non-agglomerated powder may be prepared even if the solvent is allowed to melt, provided that the pressure within the freeze-dryer is maintained at a level that the evaporation rate of the liquid solvent is faster than the melting rate (e.g., below about 0.2 millibar, 0.000197 atm, or 20 Pa). Thus, there is typically not enough solvent in the liquid state to result in agglomeration of the supports. Advantageously, this can be used to decrease the time needed to remove the solvent portion. Removing the solvent portion results in a free-flowing and non-agglomerated supported powder that comprises the supports and deposits of the metal species on the supports.

To accomplish the conversion from precursor to metal, the powder is typically heated in a reducing atmosphere (e.g., an atmosphere containing hydrogen and/or an inert gas such as argon) at a temperature sufficient to decompose the precursor. The temperature reached during the thermal treatment is typically at least as high as the decomposition temperature(s) for the precursor compound(s) and not so high as to result in degradation of the supports and agglomeration of the supports and/or the catalyst deposits. Typically the temperature is between about 60° C. and about 1100° C. Inorganic metal-containing compounds typically decompose at temperatures between about 600 and 1000° C.

The duration of the heat treatment is typically at least sufficient to substantially convert the precursor deposits to the desired state. In general, the temperature and time are inversely related (i.e., conversion is accomplished in a shorter period of time at higher temperatures and vice versa). At the temperatures typical for converting the inorganic metal-containing compounds to an alloy set forth above, the duration of the heat treatment is typically at least about 30 minutes. In one embodiment, the duration is between about 1 and about 14 hours, or about 2 and about 12 hours.

Referring to FIG. 1, a carbon supported catalyst alloy powder particle 1 of the present invention, produced in accordance with the freeze-drying method described or illustrated herein, comprises a carbon support 2 and deposits 3 of the catalyst alloy on the support. A particle and a powder comprising said particles may have a loading that is up to about 90 weight percent. However, when a supported metal powder is used as a fuel cell catalyst, the loading is typically between about 5 and about 60 weight percent, and in one embodiment between about 15 and about 45 or about 55 weight percent, or between about 20 and about 40 or about 50 weight percent (e.g., about 20 weight percent, about 40 weight percent, or about 50 weight percent). Increasing the loading to greater than about 60 weight percent does not typically result in an increase in the activity. Without being held to a particular theory, it is believed the excess loading covers a portion of the deposited metal and the covered portion cannot catalyze the desired electrochemical reaction. On the other hand, the activity of the supported metal catalyst typically decreases significantly if the loading is below about 5 weight percent.

This freeze-dry method may be used to produce supported catalyst alloy powders that are heavily loaded with nanoparticle deposits of a catalyst alloy that comprises one or more non-noble metals, wherein the deposits have a relatively narrow size distribution. In one embodiment the supported non-noble metal-containing catalyst alloy powder has a metal loading of at least about 20 weight percent of the powder, an average deposit size that is no greater than about 10 nm, and a deposit size distribution in which at least about 70 percent of the deposits are within about 50 and 150 percent of the average deposit size. In other embodiments the metal loading is between about 20 and about 60 weight percent, or between about 20 and about 40 weight percent. In other embodiments the average size of the catalyst alloy deposits is no greater than about 5 nm (50 Å), no greater than about 3 nm (30 Å), or no greater than about 2 nm (20 Å). In another embodiment the average size of the catalyst alloy deposits is between about 3 nm and about 10 nm. In another embodiment the size distribution of the deposits is such that at least about 80 percent of the deposits are within about 75 and 125 percent of the average deposit size.

The freeze-dry method of preparing supported catalyst powders allows for superior control of the stoichiometry of the deposits because the suspension is preferably kept within a single container, the solution is not physically separated from the supports (e.g., by filtration), and freezing results in substantially all of the solute precipitating on the supports. Additionally, the deposits tend to be isolated, small, and uniformly dispersed over the surface of the supports and thereby increasing the overall electrocatalytic activity. Still further, because filtering is not necessary, extremely fine particles are not lost and the supported metal powders produced by this method tend to have a greater surface area and activity. Also, the act of depositing the metal species on the supports is fast. For example, immersing a container of the suspension in a cryogenic liquid can solidify the suspension in about three to four minutes.

Unsupported Catalyst in Electrode/Fuel Cell Applications

It is to be noted that, in another embodiment of the present invention, the catalyst (e.g., the catalyst comprising or consisting essentially of an alloy of the metal components) may be unsupported; that is, it may be employed in the absence of a support particle. More specifically, it is to be noted that in another embodiment of the present invention a metal catalyst comprising platinum, titanium and tungsten may be directly deposited (e.g., sputtered) onto, for example, (i) a surface of one or both of the electrodes (e.g., the anode, the cathode or both), and/or (ii) one or both surfaces of a polyelectrolyte membrane, and/or (iii) some other surface, such as a backing for the membrane (e.g., carbon paper).

In this regard it is to be further noted that each component (e.g., metal) of the catalyst may be deposited separately, each for example as a separate layer on the surface of the electrode, membrane, etc. Alternatively, two or more components may be deposited at the same time. Additionally, when the catalyst comprises or consists essentially of an alloy of these metals, the alloy may be formed and then deposited, or the components thereof may be deposited and then the alloy subsequently formed thereon.

Deposition of the component(s) may be achieved using means known in the art, including for example known sputtering techniques (see, e.g., PCT Application No. WO 99/16137). Generally speaking, however, in one approach sputter-deposition is achieved by creating, within a vacuum chamber in an inert atmosphere, a voltage differential between a target component material and the surface onto which the target component is to be deposited, in order to dislodge particles from the target component material which are then attached to the surface of, for example, an electrode or electrolyte membrane, thus forming a coating of the target component thereon. In one embodiment, the components are deposited on a polymeric electrolyte membrane, including for example (i) a copolymer membrane of tetrafluoroethylene and perfluoropolyether sulfonic acid (such as the membrane material sold under the trademark NAFION), (ii) a perfluorinated sulfonic acid polymer (such as the membrane material sold under the trademark ACIPLEX), (iii) polyethylene sulfonic acid polymers, (iv) polyketone sulfonic acids, (v) polybenzimidazole doped with phosphoric acid, (vi) sulfonated polyether sulfones, and (vii) other polyhydrocarbon-based sulfonic acid polymers.

It is to be noted that the specific amount of each metal or component of the catalyst may be controlled independently, in order to tailor the composition to a given application. In some embodiments, however, the amount of each deposited component, or alternatively the amount of the deposited catalyst (e.g., catalyst alloy), may be less than about 5 mg/cm$^2$ of surface area (e.g., electrode surface area, membrane surface area, etc.), less than about 1 mg/cm$^2$, less than about 0.5 mg/cm$^2$, less than about 0.1 mg/cm$^2$, or even less than about 0.05 mg/cm$^2$. In other embodiments, the amount of the deposited component, or alternatively the amount of the deposited catalyst (e.g., catalyst alloy), may range from about 0.5 mg/cm$^2$ to less than about 5 mg/cm$^2$, or from about 0.1 mg/cm$^2$ to less than about 1 mg/cm$^2$.

It is to be further noted that the specific amount of each component, or the catalyst, and/or the conditions under which the component, or catalyst, are deposited, may be controlled in order to control the resulting thickness of the component, or catalyst, layer on the surface of the electrode, electrolyte membrane, etc. For example, as determined by means known in the art (e.g., scanning electron microscopy or Rutherford back scattering spectrophotometric method), the deposited layer of the component or catalyst may have a thickness ranging from several angstroms (e.g., about 2, 4, 6, 8, 10 Å or more) to several tens of angstroms (e.g., about 20, 40, 60, 80, 100 Å or more), up to several hundred angstroms (e.g., about 200, 300, 400, 500 Å or more). Additionally, after all of the components have been deposited, and optionally alloyed (or, alternatively, after the catalyst has been deposited, and optionally alloyed), the layer of the multi-component catalyst of the present invention may have a thickness ranging from several tens of angstroms (e.g., about 20, 40, 60, 80, 100 Å or more), up to several hundred angstroms (e.g., about 200, 400, 600, 800, 1000, 1500 Å or more). Thus, in different embodiments the thickness may be, for example, between about 10 and about 500 angstroms (Å), between about 20 and about 200 angstroms (Å), and between about 40 and about 100 angstroms (Å).

It is to be still further noted that in embodiments wherein a catalyst (or the components thereof) are deposited as a thin film on the surface of, for example, an electrode or electrolyte membrane, the composition of the deposited catalyst may be as previously described herein. Additionally, in other embodiments, the composition of the deposited catalyst or alloy may be other than as previously described. For example, with respect to an unsupported catalyst, the concentration of platinum may be no more than about 60 atomic percent, or alternatively it may be more than about 60 atomic percent.

Incorporation of the Catalyst in a Fuel Cell

Figure 2:
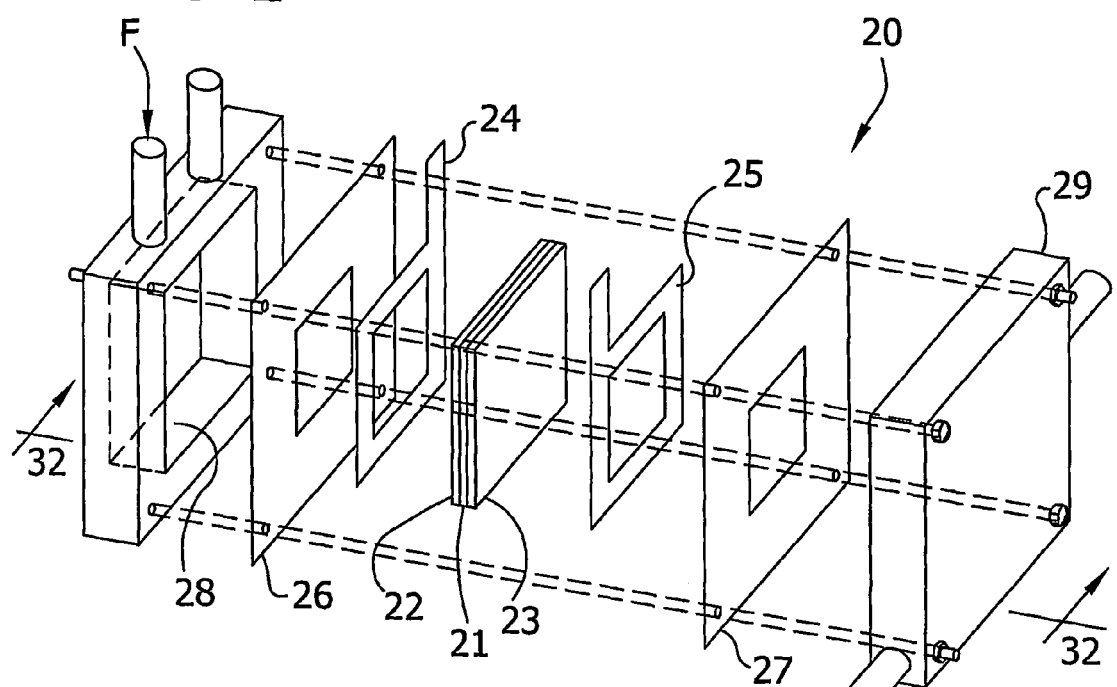
FIG. 2 is an exploded, schematic structural view showing members of a fuel cell.
Figure 3:
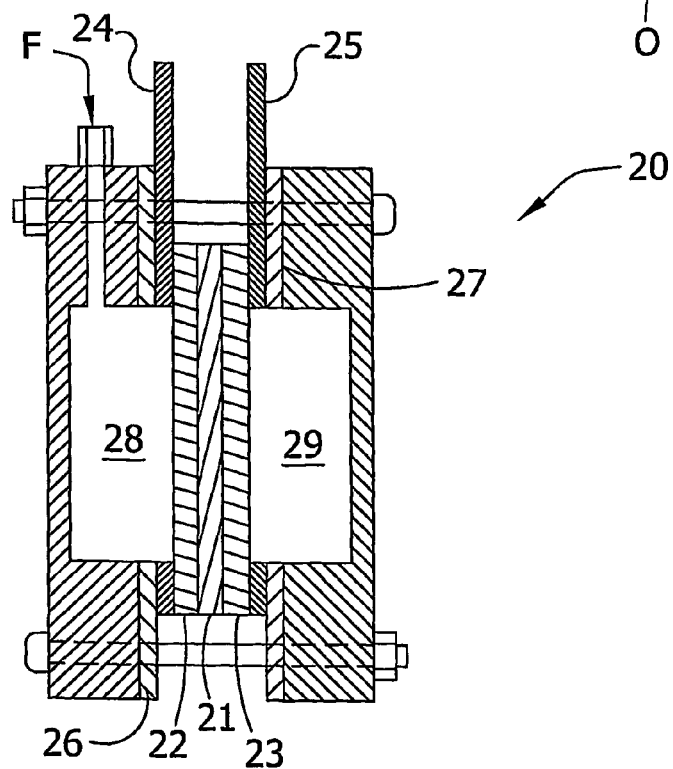
FIG. 3 is a cross-sectional view of the assembled fuel cell of FIG. 2.

The catalyst compositions of the present invention are particularly suited for use in proton exchange membrane fuel cells. As shown in FIGS. 2 and 3, a fuel cell, generally indicated at 20, comprises a fuel electrode (anode) 22 and an air electrode/oxidizer electrode (cathode) 23. In between the electrodes 22 and 23, a proton exchange membrane 21 serves as an electrolyte and is usually a strongly acidic ion exchange membrane such as a perfluorosulphonic acid-based membrane. Preferably, the proton exchange membrane 21, the anode 22, and the cathode 23 are integrated into one body to minimize contact resistance between the electrodes and the proton exchange membrane. Current collectors 24 and 25 engage the anode and the cathode, respectively. A fuel chamber 28 and an air chamber 29 contain the respective reactants and are sealed by sealants 26 and 27, respectively.

In general, electricity is generated by hydrogen-containing fuel combustion (i.e., the hydrogen-containing fuel and oxygen react to form water, carbon dioxide and electricity). This is accomplished in the above-described fuel cell by introducing the hydrogen-containing fuel F into the fuel chamber 28, while oxygen O (preferably air) is introduced into the air chamber 29, whereby an electric current can be immediately transferred between the current collectors 24 and 25 through an outer circuit (not shown). Ideally, the hydrogen-containing fuel is oxidized at the anode 22 to produce hydrogen ions, electrons, and possibly carbon dioxide gas. The hydrogen ions migrate through the strongly acidic proton exchange membrane 21 and react with oxygen and electrons transferred through the outer circuit to the cathode 23 to form water. If the hydrogen-containing fuel F is methanol, it is preferably introduced as a dilute acidic solution to enhance the chemical reaction, thereby increasing power output (e.g., a 0.5 M methanol/0.5 M sulfuric acid solution).

To prevent the loss of ionic conduction in the proton exchange membranes, these typically remain hydrated during operation of the fuel cell. As a result, the material of the proton exchange membrane is typically selected to be resistant to dehydration at temperatures up to between about 100 and about 120° C. Proton exchange membranes usually have reduction and oxidation stability, resistance to acid and hydrolysis, sufficiently low electrical resistivity (e.g., <10 Ω·cm), and low hydrogen or oxygen permeation. Additionally, proton exchange membranes are usually hydrophilic. This ensures proton conduction (by reversed diffusion of water to the anode), and prevents the membrane from drying out thereby reducing the electrical conductivity. For the sake of convenience, the layer thickness of the membranes is typically between 50 and 200 μm. In general, the foregoing properties are achieved with materials that have no aliphatic hydrogen-carbon bonds, which, for example, are achieved by replacing hydrogen with fluorine or by the presence of aromatic structures; the proton conduction results from the incorporation of sulfonic acid groups (high acid strength). Suitable proton-conducting membranes also include perfluorinated sulfonated polymers such as NAFION and its derivatives produced by E.I. du Pont de Nemours & Co., Wilmington, Del. NAFION is based on a copolymer made from tetrafluoroethylene and perfluorovinylether, and is provided with sulfonic groups working as ion-exchanging groups. Other suitable proton exchange membranes are produced with monomers such as perfluorinated compounds (e.g., octafluorocyclobutane and perfluorobenzene), or even monomers with C—H bonds that do not form any aliphatic H atoms in a plasma polymer, which could constitute attack sites for oxidative breakdown.

The electrodes of the present invention comprise the catalyst compositions of the present invention and an electrode substrate upon which the catalyst is deposited. In one embodiment, the catalyst is directly deposited on the electrode substrate. In another embodiment, the catalyst is supported on electrically conductive supports and the supported catalyst is deposited on the electrode substrate. The electrode may also comprise a proton conductive material that is in contact with the catalyst. The proton conductive material may facilitate contact between the electrolyte and the catalyst, and may thus enhance fuel cell performance. Preferably, the electrode is designed to increase cell efficiency by enhancing contact between the reactant (i.e., fuel or oxygen), the electrolyte and the catalyst. In particular, porous or gas diffusion electrodes are typically used since they allow the fuel/oxidizer to enter the electrode from the face of the electrode exposed to the reactant gas stream (back face), and the electrolyte to penetrate through the face of the electrode exposed to the electrolyte (front face), and reaction products, particularly water, to diffuse out of the electrode.

Preferably, the proton exchange membrane, electrodes, and catalyst materials are in contact with each other. This is typically accomplished by depositing the catalyst either on the electrode, or on the proton exchange membrane, and then placing the electrode and membrane in contact. The catalysts of this invention can be deposited on either the electrode or the membrane by a variety of methods, including plasma deposition, powder application (the powder may also be in the form of a slurry, a paste, or an ink), chemical plating, and sputtering. Plasma deposition generally entails depositing a thin layer (e.g., between 3 and 50 µm, preferably between 5 and 20 µm) of an catalyst composition on the membrane using low-pressure plasma. By way of example, an organic platinum compound such as trimethylcyclopentadienylplatinum is gaseous between $10^{-4}$ and 10 mbar and can be excited using radio-frequency, microwaves, or an electron cyclotron resonance transmitter to deposit platinum on the membrane. According to another procedure, catalyst powder is distributed onto the proton exchange membrane surface and integrated at an elevated temperature under pressure. If, however, the amount of catalyst powder exceeds about 2 mg/cm$^2$, the inclusion of a binder such as polytetrafluoroethylene is common. Further, the catalyst may be plated onto dispersed small support particles (e.g., the size is typically between 20 and 200 Å, and more preferably between about 20 and 100 Å). This increases the catalyst surface area, which in turn increases the number of reaction sites leading to improved cell efficiency. In one such chemical plating process, for example, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at high speed, a dilute solution of suitable fixing agent such as ammonia, hydrazine, formic acid, or formalin is slowly added dropwise to disperse and deposit the metallic components on the carrier as insoluble compounds or partly reduced fine metal particles.

The loading, or surface concentration, of a catalyst on the membrane or electrode is based in part on the desired power output and cost for a particular fuel cell. In general, power output increases with increasing concentration; however, there is a level beyond which performance is not improved. Likewise, the cost of a fuel cell increases with increasing concentration. Thus, the surface concentration of catalyst is selected to meet the application requirements. For example, a fuel cell designed to meet the requirements of a demanding application such as an extraterrestrial vehicle will usually have a surface concentration of catalyst sufficient to maximize the fuel cell power output. For less demanding applications, economic considerations dictate that the desired power output be attained with as little catalyst as possible. Typically, the loading of catalyst is between about 0.01 and about 6 mg/cm$^2$. Experimental results to date indicate that in some embodiments the catalyst loading is preferably less than about 1 mg/cm$^2$, and more preferably between about 0.1 and 1 mg/cm$^2$.

To promote contact between the collector, electrode, catalyst, and membrane, the layers are usually compressed at high temperature. The housings of the individual fuel cells are configured in such a way that a good gas supply is ensured, and at the same time the product water can be discharged properly. Typically, several fuel cells are joined to form stacks, so that the total power output is increased to economically feasible levels.

In general, the catalyst compositions and fuel cell electrodes of the present invention may be used to electrocatalyze any fuel containing hydrogen (e.g., hydrogen and reformated-hydrogen fuels). Also, hydrocarbon-based fuels may be used including saturated hydrocarbons such as methane (natural gas), ethane, propane and butane; garbage off-gas; oxygenated hydrocarbons such as methanol and ethanol; and fossil fuels such as gasoline and kerosene; and mixtures thereof.

To achieve the full ion-conducting property of proton exchange membranes, in some embodiments suitable acids (gases or liquids) are typically added to the fuel. For example, $SO_2$, $SO_3$, sulfuric acid, trifluoromethanesulfonic acid or the fluoride thereof, also strongly acidic carboxylic acids such as trifluoroacetic acid, and volatile phosphoric acid compounds may be used ("Ber. Bunsenges. Phys. Chem.", Volume 98 (1994), pages 631 to 635).

Fuel Cell Uses

As set forth above, the metal-containing substances of the present invention are useful as catalysts in fuel cells that generate electrical energy to perform useful work (e.g., electrocatalysts). For example, the catalyst alloy compositions may be used in fuel cells which are in electrical utility power generation facilities; uninterrupted power supply devices; extraterrestrial vehicles; transportation equipment such as heavy trucks, automobiles, and motorcycles (see, Fuji et al., U.S. Pat. No. 6,048,633; Shinkai et al., U.S. Pat. No. 6,187,468; Fuji et al., U.S. Pat. No. 6,225,011; and Tanaka et al., U.S. Pat. No. 6,294,280); residential power generation systems; mobile communications equipment such as wireless telephones, pagers, and satellite phones (see, Prat et al., U.S. Pat. No. 6,127,058 and Kelley et al., U.S. Pat. No. 6,268,077); mobile electronic devices such as laptop computers, personal data assistants, audio recording and/or playback devices, digital cameras, digital video cameras, and electronic game playing devices; military and aerospace equipment such as global positioning satellite devices; and robots.

Definitions

Activity is defined as the maximum sustainable, or steady state, current (Amps) obtained from the electrocatalyst, when fabricated into an electrode, at a given electric potential (Volts). Additionally, because of differences in the geometric area of electrodes, when comparing different electrocatalysts, activity is often expressed in terms of current density (A/cm$^2$).

An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. These solid solutions may have characteristics that may be distinguishable through characterization techniques such as XRD. Significant changes in XRD may be apparent due to changes in symmetry. Although the global arrangement of the metal atoms may be similar in the case of a solid solution and an ordered alloy, the relationship between the specific locations of the metal A and metal B atoms is now ordered, not random, resulting in different diffraction patterns. Further, a homogeneous alloy is a single compound comprising the constituent metals. A heterogeneous alloy comprises an intimate mixture of individual metals and/or metal-containing compounds (see, Structural Inorganic Chemistry, A. F. Wells, Oxford University Press, 5th Edition, 1995, chapter 29). An alloy, as defined herein, is also meant to include materials which may comprise elements which are generally considered to be non-metallic. For example, some alloys of the present invention may comprise oxygen and/or carbon in an amount(s) that a generally considered to be a low or impurity level (see, e.g., Structural Inorganic Chemistry, A. F. Wells, Oxford University Press, 5th Edition, 1995, chapter 29).

EXAMPLES

Example 1

Forming Catalysts on Individually Addressable Electrodes

The catalyst compositions set forth in Tables A-C, infra, were prepared using the combinatorial techniques disclosed in Warren et al., U.S. Pat. No. 6,187,164; Wu et al., U.S. Pat. No. 6,045,671; Strasser, P., Gorer, S. and Devenney, M., *Combinatorial Electrochemical Techniques For The Discovery of New Fuel-Cell Cathode Materials*, Nayayanan, S. R., Gottesfeld, S. and Zawodzinski, T., eds., Direct Methanol Fuel Cells, Proceedings of the Electrochemical Society, New Jersey, 2001, p. 191; and Strasser, P., Gorer, S. and Devenney, M., *Combinatorial Electrochemical Strategies For The Discovery of New Fuel-Cell Electrode Materials*, Proceedings of the International Symposium on Fuel Cells for Vehicles, 41st Battery Symposium, The Electrochemical Society of Japan, Nagoya 2000, p. 153. For example, an array of independent electrodes (with areas of between about 1 and 3 mm$^2$) may be fabricated on inert substrates (e.g., glass, quartz, sapphire alumina, plastics, and thermally treated silicon). The individual electrodes were located substantially in the center of the substrate, and were connected to contact pads around the periphery of the substrate with wires. The electrodes, associated wires, and contact pads were fabricated from a conducting material (e.g., titanium, gold, silver, platinum, copper or other commonly used electrode materials).

Specifically, the catalyst compositions set forth in Tables A-C were prepared using a photolithography/RF magnetron sputtering technique (GHz range) to deposit a thin film of the catalysts on arrays of 64 individually addressable electrodes. A quartz insulating substrate was provided and photolithographic techniques were used to design and fabricate the electrode patterns on it. By applying a predetermined amount of photoresist to the substrate, photolyzing preselected regions of the photoresist, removing those regions that have been photolyzed (e.g., by using an appropriate developer), depositing a layer of titanium about 500 nm thick using RF magnetron sputtering over the entire surface and removing predetermined regions of the deposited titanium (e.g. by dissolving the underlying photoresist), intricate patterns of individually addressable electrodes were fabricated on the substrate.

Figure 4:
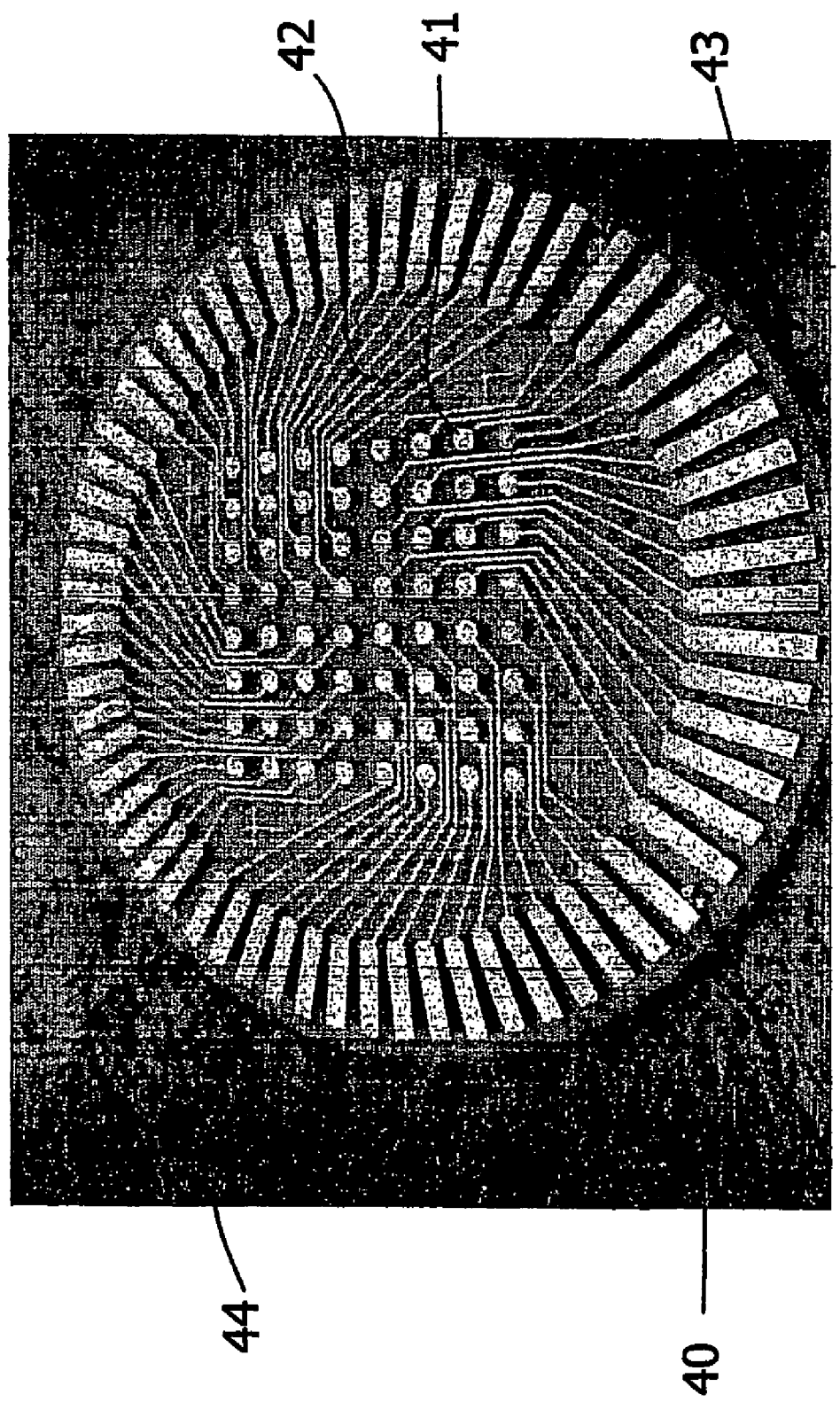
FIG. 4 is a photograph of an electrode array comprising thin film catalyst compositions deposited on individually addressable electrodes, in accordance with the present invention.

Referring to FIG. 4, the fabricated array 40 consisted of 64 individually addressable electrodes 41 (about 1.7 mm in diameter) arranged in an 8×8 square that were isolated from each other (by adequate spacing) and from the substrate 44 (fabricated on an insulating substrate), and whose interconnects 42 and contact pads 43 were insulated from the electrochemical testing solution (by the hardened photoresist or other suitable insulating material).

After the initial array fabrication and prior to depositing the catalysts for screening, a patterned insulating layer covering the wires and an inner portion of the peripheral contact pads was deposited, but leaving the electrodes and the outer portion of the peripheral contact pads exposed (preferably approximately half of the contact pad is covered with this insulating layer). Because of the insulating layer, it is possible to connect a lead (e.g., a pogo pin or an alligator clip) to the outer portion of a given contact pad and address its associated electrode while the array is immersed in solution, without having to worry about reactions that can occur on the wires or peripheral contact pads. The insulating layer was a hardened photoresist, but any other suitable material known to be insulating in nature could have been used (e.g., glass, silica, alumina, magnesium oxide, silicon nitride, boron nitride, yttrium oxide, or titanium dioxide).

Following the creation of the titanium electrode array, a steel mask having 64 holes (1.7 mm in diameter) was pressed onto the substrate to prevent deposition of sputtered material onto the insulating resist layer. The deposition of the catalysts was also accomplished using RF magnetron sputtering and a two shutter masking system as described by Wu et al. which enable the deposition of material onto 1 or more electrodes at a time. Each individual thin film catalyst was created by a super lattice deposition method. For example, when preparing a catalyst composition comprising metals M1, M2 and M3, each is deposited, and then partially or fully alloyed, onto one electrode. More specifically, first a metal M1 sputter target is selected and a thin film of M1 having a defined thickness is deposited on the electrode. This initial thickness is typically from about 3 to about 12 Å. After this, metal M2 is selected as the sputter target and a layer of M2 is deposited onto the layer of M1. The thickness of M2 layer is also from about 3 to about 12 Å. The thicknesses of the deposited layers are in the range of the diffusion length of the metal atoms (e.g., about 10 to about 30 Å) which allows in-situ alloying of the metals. Then, a layer of M3 is deposited onto the M1-M2 alloy forming a M1-M2-M3 alloy film. As a result of the three deposition steps, an alloy thin film (9-25 Å thickness) of the desired stoichiometry is created. This concludes one deposition cycle. In order to achieve the desired total thickness of a catalyst material, deposition cycles are repeated as necessary which results in the creation of a superlattice structure of a defined total thickness (typically about 700 Å). Although the number, thickness (stoichiometry) and order of application of the individual metal layers may be determined manually, it is desirable to utilize a computer program to design an output file which contains the information necessary to control the operation of the sputtering device during the preparation of a particular library wafer (i.e., array). One such computer program is the LIBRARY STUDIO software available from Symyx Technologies, Inc. of Santa Clara, Calif. and described in European Patent No. 1080435 B1. The compositions of several as-sputtered alloys were analyzed using Electron Dispersive Spectroscopy (EDS) to confirm that they were consistent with desired compositions (chemical compositions determined using EDS are within about 5% of the actual composition).

Arrays were prepared to evaluate the specific alloy compositions set forth in Tables A-C, below. On each array one electrode consisted essentially of platinum and served as an internal standard for the screening operation.

TABLE A

| Electrode Number | End Current Density (Absolute Activity) mA/cm$^2$ | End Current Density per Weight Fraction of Pt | Relative Activity Compared to Internal Pt | Pt atomic % | Ti atomic % | W atomic % |
|---|---|---|---|---|---|---|
| 34 | −4.42 | −11.69 | 29.24 | 31 | 21 | 48 |
| 17 | −2.59 | −10.39 | 17.15 | 18 | 32 | 50 |
| 25 | −2.65 | −9.28 | 17.52 | 22 | 27 | 51 |
| 10 | −2.48 | −9.23 | 16.38 | 18 | 39 | 43 |
| 35 | −4.07 | −9.19 | 26.90 | 36 | 23 | 42 |
| 9 | −1.86 | −8.75 | 12.28 | 15 | 37 | 48 |
| 33 | −2.75 | −8.61 | 18.22 | 26 | 21 | 53 |
| 27 | −3.40 | −8.35 | 22.48 | 31 | 29 | 40 |
| 49 | −3.20 | −8.31 | 21.16 | 35 | 7 | 58 |
| 41 | −2.92 | −8.28 | 19.34 | 30 | 14 | 55 |
| 2 | −1.86 | −8.13 | 12.28 | 15 | 44 | 41 |
| 3 | −2.30 | −7.94 | 15.24 | 18 | 46 | 36 |
| 42 | −3.06 | −7.43 | 20.22 | 35 | 15 | 50 |
| 28 | −3.39 | −7.10 | 22.46 | 36 | 30 | 34 |
| 52 | −3.04 | −6.73 | 20.09 | 40 | 11 | 49 |
| 19 | −2.24 | −6.05 | 14.80 | 26 | 35 | 39 |
| 4 | −2.11 | −5.88 | 13.96 | 22 | 48 | 30 |
| 12 | −2.35 | −5.87 | 15.57 | 27 | 42 | 31 |
| 15 | −1.96 | −5.76 | 12.98 | 15 | 71 | 13 |
| 26 | −1.90 | −5.55 | 12.59 | 26 | 28 | 46 |
| 20 | −2.42 | −5.49 | 16.00 | 31 | 37 | 32 |
| 18 | −1.40 | −4.57 | 9.26 | 22 | 34 | 44 |
| 5 | −1.97 | −4.50 | 13.04 | 27 | 50 | 24 |
| 13 | −2.05 | −4.28 | 13.58 | 31 | 44 | 24 |
| 45 | −2.03 | −4.05 | 13.43 | 41 | 22 | 37 |
| 6 | −2.06 | −3.91 | 13.63 | 32 | 52 | 16 |
| 11 | −1.27 | −3.84 | 8.40 | 22 | 41 | 37 |
| 38 | −1.73 | −3.07 | 11.41 | 41 | 34 | 25 |
| 7 | −1.27 | −2.02 | 8.43 | 37 | 55 | 9 |
| 14 | −0.82 | −1.43 | 5.41 | 36 | 46 | 17 |
| 31 | −0.69 | −1.07 | 4.55 | 41 | 46 | 13 |
| 37 | −0.33 | −0.85 | 2.19 | 28 | 34 | 38 |
| 46 | −0.28 | −0.43 | 1.83 | 53 | 22 | 25 |
| 39 | −0.30 | −0.41 | 1.96 | 54 | 34 | 12 |
| 53 | −0.20 | −0.34 | 1.33 | 53 | 11 | 36 |
| 50 | −0.04 | −0.27 | 0.29 | 15 | 11 | 74 |
| 43 | −0.03 | −0.15 | 0.19 | 15 | 23 | 63 |
| 64 | −0.15 | −0.15 | 1.00 | 100 | 0 | 0 |

TABLE B

| Electrode Number | End Current Density (Absolute Activity) mA/cm$^2$ | End Current Density per Weight Fraction of Pt | Relative Activity Compared to Internal Pt | Pt atomic % | Ti atomic % | W atomic % |
|---|---|---|---|---|---|---|
| 25 | −1.494 | −3.480 | 3.609 | 20 | 70 | 10 |
| 39 | −1.485 | −3.461 | 3.589 | 20 | 70 | 10 |
| 17 | −1.427 | −2.576 | 3.449 | 30 | 60 | 10 |
| 29 | −1.316 | −4.902 | 3.181 | 20 | 30 | 50 |
| 4 | −1.315 | −2.257 | 3.177 | 40 | 40 | 20 |
| 3 | −1.285 | −3.814 | 3.106 | 30 | 10 | 60 |
| 36 | −1.280 | −1.975 | 3.094 | 40 | 50 | 10 |
| 33 | −1.199 | −3.212 | 2.897 | 20 | 60 | 20 |
| 5 | −1.197 | −5.292 | 2.892 | 20 | 10 | 70 |
| 53 | −1.141 | −2.556 | 2.758 | 40 | 10 | 50 |
| 15 | −1.107 | −3.352 | 2.676 | 20 | 50 | 30 |
| 57 | −1.094 | −2.484 | 2.645 | 30 | 40 | 30 |

TABLE B-continued

| Electrode Number | End Current Density (Absolute Activity) mA/cm$^2$ | End Current Density per Weight Fraction of Pt | Relative Activity Compared to Internal Pt | Pt atomic % | Ti atomic % | W atomic % |
|---|---|---|---|---|---|---|
| 49 | −1.045 | −1.611 | 2.525 | 40 | 50 | 10 |
| 19 | −1.017 | −2.101 | 2.458 | 40 | 20 | 40 |
| 21 | −0.978 | −2.673 | 2.362 | 30 | 20 | 50 |
| 7 | −0.976 | −2.615 | 2.359 | 20 | 60 | 20 |
| 63 | −0.969 | −1.975 | 2.342 | 30 | 50 | 20 |
| 1 | −0.951 | −2.879 | 2.298 | 20 | 50 | 30 |
| 12 | −0.942 | −1.782 | 2.277 | 40 | 30 | 30 |
| 37 | −0.870 | −3.544 | 2.103 | 20 | 20 | 60 |
| 30 | −0.766 | −1.061 | 1.852 | 50 | 40 | 10 |
| 14 | −0.742 | −1.337 | 1.792 | 50 | 10 | 40 |
| 38 | −0.716 | −1.091 | 1.730 | 50 | 30 | 20 |
| 41 | −0.656 | −0.909 | 1.586 | 50 | 40 | 10 |
| 6 | −0.637 | −1.060 | 1.540 | 50 | 20 | 30 |
| 34 | −0.614 | −0.851 | 1.484 | 50 | 40 | 10 |
| 51 | −0.522 | −0.942 | 1.262 | 50 | 10 | 40 |
| 60 | −0.504 | −0.768 | 1.217 | 50 | 30 | 20 |
| 62 | −0.464 | −0.702 | 1.121 | 60 | 10 | 30 |
| 2 | −0.452 | −0.689 | 1.092 | 50 | 30 | 20 |
| 46 | −0.423 | −0.485 | 1.021 | 80 | 10 | 10 |
| 48 | −0.414 | −0.414 | 1 | 100 | 0 | 0 |
| 8 | −0.412 | −0.537 | 0.995 | 70 | 10 | 20 |
| 58 | −0.397 | −0.554 | 0.959 | 60 | 20 | 20 |
| 22 | −0.381 | −0.488 | 0.921 | 60 | 30 | 10 |
| 40 | −0.381 | −0.459 | 0.921 | 70 | 20 | 10 |
| 54 | −0.375 | −0.452 | 0.906 | 70 | 20 | 10 |
| 10 | −0.211 | −0.351 | 0.509 | 50 | 20 | 30 |
| 9 | −0.080 | −0.269 | 0.192 | 20 | 40 | 40 |

TABLE C

| Electrode Number | End Current Density (Absolute Activity) mA/cm$^2$ | End Current Density per Weight Fraction of Pt | Relative Activity Compared to Internal Pt | Pt atomic % | Ti atomic % | W atomic % |
|---|---|---|---|---|---|---|
| 21 | −4.711 | −12.880 | 4.560 | 30 | 20 | 50 |
| 63 | −4.483 | −9.134 | 4.339 | 30 | 50 | 20 |
| 3 | −4.418 | −13.106 | 4.276 | 30 | 10 | 60 |
| 39 | −4.391 | −10.233 | 4.250 | 20 | 70 | 10 |
| 35 | −4.124 | −11.276 | 3.992 | 30 | 20 | 50 |
| 57 | −4.041 | −9.172 | 3.912 | 30 | 40 | 30 |
| 17 | −4.037 | −7.287 | 3.908 | 30 | 60 | 10 |
| 25 | −3.941 | −9.184 | 3.815 | 20 | 70 | 10 |
| 27 | −3.709 | −9.280 | 3.590 | 30 | 30 | 40 |
| 29 | −3.527 | −13.134 | 3.414 | 20 | 30 | 50 |
| 36 | −2.659 | −4.101 | 2.574 | 40 | 50 | 10 |
| 49 | −2.531 | −3.904 | 2.450 | 40 | 50 | 10 |
| 7 | −2.493 | −6.678 | 2.413 | 20 | 60 | 20 |
| 33 | −2.212 | −5.924 | 2.141 | 20 | 60 | 20 |
| 12 | −2.130 | −4.028 | 2.062 | 40 | 30 | 30 |
| 53 | −2.076 | −4.649 | 2.009 | 40 | 10 | 50 |
| 19 | −1.985 | −4.099 | 1.921 | 40 | 20 | 40 |
| 4 | −1.965 | −3.373 | 1.902 | 40 | 40 | 20 |
| 1 | −1.636 | −4.953 | 1.584 | 20 | 50 | 30 |
| 14 | −1.635 | −2.948 | 1.583 | 50 | 10 | 40 |
| 9 | −1.505 | −5.080 | 1.457 | 20 | 40 | 40 |
| 37 | −1.479 | −6.023 | 1.431 | 20 | 20 | 60 |
| 10 | −1.404 | −2.336 | 1.359 | 50 | 20 | 30 |
| 34 | −1.220 | −1.690 | 1.181 | 50 | 40 | 10 |
| 51 | −1.207 | −2.176 | 1.168 | 50 | 10 | 40 |
| 5 | −1.162 | −5.138 | 1.125 | 20 | 10 | 70 |
| 38 | −1.153 | −1.757 | 1.116 | 50 | 30 | 20 |
| 6 | −1.150 | −1.914 | 1.114 | 50 | 20 | 30 |
| 2 | −1.136 | −1.731 | 1.099 | 50 | 30 | 20 |
| 60 | −1.115 | −1.699 | 1.079 | 50 | 30 | 20 |
| 41 | −1.113 | −1.541 | 1.077 | 50 | 40 | 10 |
| 48 | −1.033 | −1.033 | 1 | 100 | 0 | 0 |
| 30 | −0.972 | −1.346 | 0.941 | 50 | 40 | 10 |

TABLE C-continued

| Electrode Number | End Current Density (Absolute Activity) mA/cm² | End Current Density per Weight Fraction of Pt | Relative Activity Compared to Internal Pt | Pt atomic % | Ti atomic % | W atomic % |
|---|---|---|---|---|---|---|
| 62 | −0.972 | −1.470 | 0.941 | 60 | 10 | 30 |
| 58 | −0.735 | −1.025 | 0.711 | 60 | 20 | 20 |
| 46 | −0.734 | −0.843 | 0.711 | 80 | 10 | 10 |
| 54 | −0.718 | −0.865 | 0.695 | 70 | 20 | 10 |
| 8  | −0.682 | −0.889 | 0.660 | 70 | 10 | 20 |
| 40 | −0.643 | −0.775 | 0.622 | 70 | 20 | 10 |
| 22 | −0.586 | −0.751 | 0.568 | 60 | 30 | 10 |
| 15 | −0.527 | −1.594 | 0.510 | 20 | 50 | 30 |

Example 2

Screening Catalysts for Electrocatalytic Activity

The catalyst compositions set forth in Table A that were synthesized on arrays according to the method set forth in Example 1 were screened for electrochemical reduction of molecular oxygen to water according to Protocol 1 (detailed below) to determine electrocatalytic activity against the internal and/or external platinum standard. Additionally, the catalyst compositions set forth in Tables B and C that were synthesized on arrays according to the method set forth in Example 1 were screened for electrochemical reduction of molecular oxygen to water according to Protocol 2 (detailed below) to determine electrocatalytic activity against the internal and/or external platinum standard.

In general, the array wafers were assembled into an electrochemical screening cell and a screening device established an electrical contact between the 64 electrode catalysts (working electrodes) and a 64-channel multi-channel potentiostat used for the screening. Specifically, each wafer array was placed into a screening device such that all 64 spots are facing upward and a tube cell body that was generally annular and having an inner diameter of about 2 inches (5 cm) was pressed onto the upward facing wafer surface. The diameter of this tubular cell was such that the portion of the wafer with the square electrode array formed the base of a cylindrical volume while the contact pads were outside the cylindrical volume. A liquid ionic solution (i.e., 0.5 M $H_2SO_4$ aqueous electrolyte) was poured into this cylindrical volume, and a common counter electrode (i.e., platinum gauze) and a common reference electrode (e.g., mercury/mercury sulfate reference electrode (MMS)) were placed into the electrolyte solution to close the electrical circuit.

A rotator shaft with blades was placed into the electrolyte to provide forced convection-diffusion conditions during the screening. The rotation rate was typically between about 300 to about 400 rpm. Depending on the screening experiment, either argon or pure oxygen was bubbled through the electrolyte during the measurements. Argon served to remove $O_2$ gas in the electrolyte to simulate $O_2$-free conditions used for the initial conditioning of the catalysts. The introduction of pure oxygen served to saturate the electrolyte with oxygen for the oxygen reduction reaction. During the screening, the electrolyte was maintained at 60° C. and the rotation rate was constant.

Protocol 1: Three groups of tests were performed to screen the activity of the catalysts. The electrolyte was purged with argon for about 20 minutes prior to the electrochemical measurements. The first group of tests comprised cyclic voltammetric measurements while purging the electrolyte with argon. Specifically, the first group of tests comprised:

a. a potential sweep from open circuit potential (OCP) to about +0.3 V to about −0.63 V and back to about +0.3 V at a rate of about 20 mV/s;

b. seventy-five consecutive potential sweeps from OCP to about +0.3 V to about −0.7 V and back to about +0.3 V at a rate of about 200 mV/s; and c. a potential sweep from OCP to about +0.3 V to about −0.63 V and back to about +0.3 V at a rate of about 20 mV/s.

The shape of the cyclic voltammetric (CV) profile of the internal Pt standard catalyst as obtained in test (c) was compared to an external standard CV profile obtained from a Pt thin film electrode that had been pretreated until a stable CV was obtained. If test (c) resulted in a similar cyclic voltammogram, the first group of experiments was considered completed. If the shape of the cyclic voltammogram of test (c) did not result in the expected standard Pt CV behavior, tests (b) and (c) were repeated until the Pt standard catalyst showed the desired standard voltammetric profile. In this way, it was ensured that the Pt standard catalyst showed a stable and well-defined oxygen reduction activity in subsequent experiments. The electrolyte was then purged with oxygen for approximately 30 minutes. The following second group of tests were performed while continuing to purge with oxygen:

a. measuring the open circuit potential (OCP) for a minute; then, the potential was stepped to −0.4 V, held for a minute, and was then swept up to about +0.4 V at a rate of about 10 mV/s;

b. measuring the OCP for a minute; then applying a potential step from OCP to about +0.1 V while measuring the current for about 5 minutes; and c. measuring the OCP for a minute; then applying a potential step from OCP to about +0.2 V while monitoring the current for about 5 minutes.

The third group of tests comprised a repeat of the second group of tests after about one hour from completion of the second group of tests. The electrolyte was continually stirred and purged with oxygen during the waiting period. All the foregoing test voltages are with reference to a mercury/mercury sulfate (MMS) electrode. Additionally, an external platinum standard comprising an array of 64 platinum electrodes was used to monitor the tests to ensure the accuracy and consistency of the oxygen reduction evaluation.

Protocol 2: Four groups of tests were performed to screen the activity of the catalysts. The first group is a pretreatment process, whereas the other three groups are identical sets of experiments in order to screen the oxygen reduction activity as well as the current electrochemical surface area of the catalysts. The electrolyte was purged with argon for about 20 minutes prior to the electrochemical measurements. The first group of tests comprised cyclic voltammetric measurements while purging the electrolyte with argon. Specifically, the first group of tests comprised:

a. a potential sweep from open circuit potential (OCP) to about +0.3 V to about −0.63 V and back to about +0.3 V at a rate of about 20 mV/s;

b. fifty consecutive potential sweeps from OCP to about +0.3 V to about −0.7 V and back to about +0.3 V at a rate of about 200 mV/s; and c. a potential sweep from OCP to about +0.3 V to about −0.63 V and back to about +0.3 V at a rate of about 20 mV/s.

After step (c) of the first group of tests, the electrolyte was purged with oxygen for approximately 30 minutes. Then, the following second group of tests were performed, which comprised a test in an oxygen-saturated solution (i.e., test (a)), followed by a test performed in an Ar-purged (i.e., an oxygen-free solution, test (b)):

a. in an oxygen-saturated solution, the OCP was measured for a minute; a potential step was then applied from OCP to about −0.4 V; this potential was held for approximately 30 seconds, and then the potential was stepped to about +0.1 V while measuring the current for about 5 minutes; and b. after purging the electrolyte with Ar for approximately 30 minutes, a potential sweep was performed from open circuit potential (OCP) to about +0.3 V to about −0.63 V and back to about +0.3 V, at a rate of about 20 mV/s.

The third and fourth group of tests comprised a repeat of the second group of tests after completion. All the foregoing test voltages are with reference to a mercury/mercury sulfate (MMS) electrode. Additionally, an external platinum standard comprising an array of 64 platinum electrodes was used to monitor the tests to ensure the accuracy and consistency of the oxygen reduction evaluation.

The specific catalyst compositions set forth in Table A, as well as Tables B and C, were prepared and screened in accordance with the above-described methods of Protocols 1 (Table A) or 2 (Tables B and C), and the test results are set forth therein. The screening results in Table A are for the third test group (steady state currents at +0.1 V MMS). The screening results in Tables B and C were taken from the oxygen reduction measurements of the fourth group of tests (i.e., the last screening in an oxygen-saturated solution), the Ar-saturated steps serving as an evaluation of additional catalyst related parameters such as surface area over time.

The current value reported (End Current Density) is the result of averaging the last three current values of the chronoamperometric test normalized for geometric surface area. It is to be noted, from the results presented in these Tables, that numerous compositions exhibited an oxygen reduction activity which exceeded, for example, the internal platinum standard (see, e.g., the catalyst compositions corresponding to Electrode Numbers 34, 17, 25, 10, 35, 9, 33, 27, 49, 41, 2, 3, 42, 28, 52, 19, 4, 12, 15, 26, 20, 18, 5, 13, 45, 6, 11, 38, 7, 14, 31, 37, 46, 39, 53, 50, and 43 in Table A, the catalyst compositions corresponding to Electrode Numbers 25, 39, 17, 29, 4, 3, 36, 33, 5, 53, 15, 57, 49, 19, 21, 7, 63, 1, 12, 37, 30, 14, 38, 41, 6, 34, 51, 60, 62, 2, 46, 8, 58, 22, 40, and 54 in Table B, and catalyst compositions corresponding to Electrode Numbers 21, 63, 3, 39, 35, 57, 17, 25, 27, 29, 36, 49, 7, 33, 12, 53, 19, 4, 1, 14, 9, 37, 10, 34, 51, 5, 38, 6, 2, 60, 41, 30, 62 and 15 in Table C).

Example 3

Synthesis of Supported Catalysts

The synthesis of multiple platinum-titanium-tungsten catalyst compositions (see, Table D, infra) on carbon support particles was attempted according to different process conditions, in order to evaluate the performance of the catalysts while in a state that is typically used in fuel cell. To do so, the catalyst component precursors were deposited or precipitated on supported platinum powder (i.e., platinum nanoparticles supported on carbon black particles). Platinum supported on carbon black is commercially available from companies such as Johnson Matthey, Inc., of New Jersey and E-Tek Div. of De-Nora, N.A., Inc., of Somerset, N.J. Such supported platinum powder is available with a wide range of platinum loading. The supported platinum powder used in this example had a nominal platinum loading of about 20 or about 40 percent by weight, a platinum surface area of between about 150 and about 170 $m^2/g$ (determined by CO adsorption), a combined carbon and platinum surface area between about 350 and about 400 $m^2/g$ (determined by $N_2$ adsorption), and an average particle size of less than about 0.5 mm (determined by sizing screen).

The catalyst compositions of Table D (infra) were formed on carbon support particles using a freeze-drying precipitation method. The freeze-drying method comprised forming a precursor solution comprising the desired metal atoms in the desired concentrations. Each of the supported catalysts were prepared in an analogous manner with variations in the amounts of metal-containing compounds. For example, the target $Pt_{40}Ti_{40}W_{20}$ catalyst composition (e.g., HFC 1235) was prepared by mixing 0.394 ml of a 0.25 M aqueous solution of $(NH_4)_2TiO(C_2O_4)_2.H_2O$ with 0.082 ml of a 0.05 M aqueous solution of $(NH_4)_{10}W_{12}O_{41}.5H_2O$ and 2.024 ml of $H_2O$. The clear solution was introduced into a HDPE vial containing 0.100 g of supported platinum powder, which had a nominal platinum loading of about 19.2 weight percent, resulting in a black suspension. The suspension was homogenized by immersing a probe of a BRANSON SONIFIER 150 into the vial and sonicating the mixture for about 90 seconds at a power level of 3. The vial containing the homogenized suspension was then immersed in a liquid nitrogen bath for about 3 minutes to solidify the suspension. The solid suspension was then freeze-dried for about 24 hours using a LABCONCO FREEZE DRY SYSTEM (Model 79480) to remove the solvent. The tray and the collection coil of the freeze dryer were maintained at about 27° C. and about −49° C., respectively, while evacuating the system (the pressure was maintained at about 0.15 mbar). After freeze-drying, the vial contained a powder comprising the supported platinum powder, and the tungsten and titanium precursors deposited thereon.

The recovered precursor powders were then subjected to a heat treatment to reduce the precursors to their metallic state, and to fully or partially alloy the metals with each other and the platinum on the carbon black particles. One particular heat treatment comprised heating the powder in a quartz flow furnace with an atmosphere comprising about 6% $H_2$ and 94% Ar using a temperature profile of room temperature to about 40° C. at a rate of about 5° C./min; holding at about 40° C. for 2 hours; increasing the temperature to about 200° C. at a rate of 5° C./min; holding at about 200° C. for two hours; increasing the temperature at a rate of about 5° C./min to about 600, 700, 800, 900, or 950° C.; holding at a max temperature of about 600, 700, 800, 900, or 950° C. for a duration of about 2, 7, 10, or 12 hours (as indicated in Table D, infra); and, cooling down to room temperature.

In order to determine the actual composition of the supported catalysts, the differently prepared catalysts (e.g., by composition variation or by heat treatment variation) were subjected to EDS (Electron Dispersive Spectroscopy) elemental analysis (the sample powders being compressed into 6 mm diameter pellets with a thickness of about 1 mm). Alternatively, the compositions of one or more of the differently prepared supported catalysts (e.g., by composition variation or by heat treatment variation) may have been determined using lCP elemental analysis. The target composition and actual compositions for certain supported catalysts are set forth in Table D.

TABLE D

| Powder Name | Target Catalyst Comp. | Max Temp. for a duration | Actual Catalyst Comp. | Target Pt Loading (wt %) | Pt Loading (wt %) | Log Pt Mass Activity at +0.15 V MMS | Pt Mass Activity at +0.15 V MMS | Projected Relative Performance at +0.15 V MMS | Relative Performance at +0.15 V MMS |
|---|---|---|---|---|---|---|---|---|---|
| HFC 10 | Pt | — | Pt | 37.8 | 37.8 | 2.11 | 128.82 | 1.00 | 1.00 |
| HFC181 | Pt30Ti22W48 | 700/7 | Pt30Ti24W46 | 14.4 | 14.4 | 2.51 | 325.76 | 2.53 | 2.53 |
| HFC182 | Pt30Ti22W48 | 900/2 | — | 14.4 | — | — | — | 2.26 | — |
| HFC181a | Pt30Ti22W48 | 700/2 | Pt30Ti24W46 | 14.4 | 14.4 | 2.54 | 346.29 | 2.69 | 2.69 |
| HFC402 | Pt30Ti22W48 | 700/7 | — | 14.5 | — | — | — | 1.92 | — |
| HFC403 | Pt40Ti11W49 | 700/7 | — | 15.6 | — | — | — | 1.80 | — |
| HFC404 | Pt40Ti40W20 | 700/7 | — | 16.9 | — | — | — | 2.16 | — |
| HFC405 | Pt40Ti50W10 | 700/7 | — | 17.4 | — | — | — | 1.46 | — |
| HFC406 | Pt60Ti30W10 | 700/7 | — | 18.2 | — | — | — | 1.79 | — |
| HFC407 | Pt30Ti22W48 | 900/2 | — | 14.5 | — | — | — | 1.86 | — |
| HFC408 | Pt40Ti11W49 | 900/2 | — | 15.6 | — | — | — | 1.65 | — |
| HFC409 | Pt40Ti40W20 | 900/2 | — | 16.9 | — | — | — | 1.33 | — |
| HFC410 | Pt40Ti50W10 | 900/2 | — | 17.4 | — | — | — | 1.16 | — |
| HFC411 | Pt60Ti30W10 | 900/2 | — | 18.2 | — | — | — | 1.34 | — |
| HFC414 | Pt40Ti40W20 | 700/7 | — | 16.9 | — | — | — | 2.04 | — |
| HFC415 | Pt40Ti40W20 | 600/7 | — | 16.9 | — | — | — | 2.10 | — |
| HFC416 | Pt40Ti40W20 | 700/12 | — | 16.9 | — | — | — | 1.97 | — |
| HFC417 | Pt40Ti40W20 | 700/12 | — | 16.9 | — | — | — | 1.91 | — |
| HFC418 | Pt40Ti40W20 | 700/12 | — | 16.9 | — | — | — | 1.91 | — |
| HFC736 | Pt30Ti22W48 | 950/10 | — | 14.4 | — | — | — | 1.78 | — |
| HFC740 | Pt30Ti22W48 | 950/2 | — | 14.4 | — | — | — | 2.45 | — |
| HFC744 | Pt30Ti22W48 | 900/10 | — | 14.4 | — | — | — | 1.70 | — |
| HFC748 | Pt30Ti22W48 | 900/2 | Pt35Ti25W40 | 14.4 | — | — | — | 1.82 | — |
| HFC752 | Pt30Ti22W48 | 800/10 | — | 14.4 | — | — | — | 2.45 | — |
| HFC756 | Pt30Ti22W48 | 800/2 | — | 14.4 | — | — | — | 2.51 | — |
| HFC760 | Pt30Ti22W48 | 700/10 | — | 14.4 | — | — | — | 2.63 | — |
| HFC764 | Pt30Ti22W48 | 700/2 | — | 14.4 | — | — | — | 2.29 | — |
| HFC768 | Pt30Ti22W48 | 600/10 | — | 14.4 | — | — | — | 1.82 | — |
| HFC772 | Pt30Ti22W48 | 600/2 | — | 14.4 | — | — | — | 2.29 | — |
| HFC1235 | Pt40Ti40W20 | 700/7 | Pt41Ti36W23 | 16.9 | — | — | — | 2.33 | — |
| HFC1236 | Pt35Ti40W25 | 700/7 | Pt38Ti35W27 | 16.2 | — | — | — | 2.77 | — |
| HFC1237 | Pt40Ti35W25 | 700/7 | — | 16.6 | — | — | — | 2.22 | — |
| HFC1238 | Pt35Ti45W20 | 700/7 | — | 16.5 | — | — | — | 2.24 | — |
| HFC1239 | Pt45Ti40W15 | 700/7 | — | 17.4 | — | — | — | 2.11 | — |
| HFC1240 | Pt35Ti35W30 | 700/7 | — | 16.0 | — | — | — | 1.98 | — |
| HFC1241 | Pt30Ti45W25 | 700/7 | — | 15.7 | — | — | — | 2.14 | — |
| HFC1242 | Pt45Ti30W25 | 700/7 | — | 17.0 | — | — | — | 2.03 | — |
| HFC1243 | Pt45Ti35W20 | 700/7 | Pt46Ti31W23 | 17.2 | — | — | — | 2.44 | — |
| HFC1244 | Pt40Ti45W15 | 700/7 | — | 17.1 | — | — | — | 2.25 | — |
| HFC1245 | Pt35Ti50W15 | 700/7 | Pt38Ti44W18 | 16.8 | — | — | — | 2.34 | — |
| HFC1246 | Pt50Ti35W15 | 700/7 | — | 17.7 | — | — | — | 1.94 | — |
| HFC1318 | Pt45Ti45W10 | 700/7 | Pt43Ti41W10 | 17.7 | — | — | — | 2.40 | — |
| HFC1319 | Pt30Ti40W30 | 700/7 | — | 15.4 | — | — | — | 2.33 | — |
| HFC1320 | Pt30Ti50W20 | 700/7 | — | 16.0 | — | — | — | 2.46 | — |
| HFC1321 | Pt40Ti30W30 | 700/7 | Pt41Ti29W30 | 16.4 | — | — | — | 2.17 | — |
| HFC1322 | Pt50Ti40W10 | 700/7 | — | 17.9 | — | — | — | 1.99 | — |
| HFC1323 | Pt25Ti45W30 | 700/7 | — | 14.7 | — | — | — | 2.27 | — |
| HFC1324 | Pt25Ti50W25 | 700/7 | — | 15.1 | — | — | — | 2.02 | — |
| HFC1325 | Pt30Ti35W35 | 700/7 | — | 15.2 | — | — | — | 1.93 | — |
| HFC1326 | Pt35Ti55W10 | 700/7 | — | 17.1 | — | — | — | 2.18 | — |
| HFC1327 | Pt55Ti30W15 | 700/7 | — | 17.9 | — | — | — | 1.80 | — |
| HFC1328 | Pt55Ti35W10 | 700/7 | Pt62Ti29W9 | 18.1 | — | — | — | 2.28 | — |
| HFC1329 | Pt25Ti40W35 | 700/7 | — | 14.5 | — | — | — | 1.77 | — |
| HFC1330 | Pt30Ti60W10 | 700/7 | — | 16.6 | — | — | — | 2.03 | — |
| HFC1331 | Pt60Ti30W10 | 700/7 | — | 18.2 | — | — | — | 1.93 | — |
| HFC1332 | Pt25Ti35W40 | 700/7 | — | 14.2 | — | — | — | 1.87 | — |
| HFC1333 | Pt25Ti60W15 | 700/7 | — | 15.7 | — | — | — | 2.03 | — |
| HFC1334 | Pt40Ti50W10 | 700/7 | — | 17.4 | — | — | — | 1.79 | — |
| HFC1335 | Pt50Ti30W20 | 700/7 | — | 17.4 | — | — | — | 2.04 | — |
| HFC1336 | Pt30Ti55W15 | 700/7 | — | 16.3 | — | — | — | 2.21 | — |
| HFC1337 | Pt35Ti30W35 | 700/7 | — | 15.7 | — | — | — | 1.86 | — |
| HEC1338 | Pt25Ti55W20 | 700/7 | Pt30Ti47W23 | 15.4 | — | — | — | 2.30 | — |
| HFC1339 | Pt30Ti30W40 | 700/7 | — | 14.9 | — | — | — | 2.09 | — |

TABLE D-continued

| | | | | | | | | | |
|---|---|---|---|---|---|---|---|---|---|
| HFC1340 | Pt25Ti30W45 | 700/7 | — | 13.9 | — | — | — | 1.98 | — |
| HFC1341 | Pt25Ti65W10 | 700/7 | Pt31Ti56W13 | 16.1 | — | — | — | 2.59 | — |
| HFC1380 | Pt35Ti60W5 | 700/7 | — | 17.4 | — | — | — | 2.20 | — |
| HEC1381 | Pt20Ti60W20 | 700/7 | Pt25Ti50W24 | 14.5 | — | — | — | 3.10 | — |
| HFC1382 | Pt30Ti65W5 | 700/7 | Pt33Ti60W7 | 17.0 | — | — | — | 2.98 | — |
| HFC1383 | Pt15Ti60W25 | 700/7 | — | 12.9 | — | — | — | 2.57 | — |
| HFC1384 | Pt25Ti70W5 | 700/7 | Pt29Ti65W6 | 16.4 | 16.2 | 2.62 | 421.56 | 3.23 | 3.27 |
| HFC1385 | Pt20Ti70W10 | 700/7 | Pt21Ti65W13 | 15.3 | — | — | — | 2.87 | — |
| HFC1386 | Pt15Ti70W15 | 700/7 | — | 13.7 | — | — | — | 2.42 | — |
| HFC1387 | Pt20Ti75W5 | 700/7 | — | 15.7 | — | — | — | 2.07 | — |
| HFC1389 | Pt15Ti65W20 | 700/7 | — | 13.3 | — | — | — | 2.48 | — |
| HFC1390 | Pt15Ti75W10 | 700/7 | — | 14.2 | — | — | — | 2.48 | — |
| HFC1391 | Pt15Ti80W5 | 700/7 | — | 14.6 | — | — | — | 2.55 | — |

| Powder Name | Projected Log Pt Mass Activity at +0.15 V MMS after 1 hr | Porjected Relative Performance at +0.15 V MMS after 1 hr | Projected Log Pt Mass Activity at +0.15 V MMS after 2nd CV | Projected Relative Performance at +0.15 V MMS after 2nd CV | Catalyst Mass Activity at +0.15 V MMS (mA/mg) | Composition after RDE testing |
|---|---|---|---|---|---|---|
| HFC 10 | — | — | — | — | 48.70 | Pt |
| HFC181 | — | — | — | — | 46.91 | Pt54Ti5W41 |
| HFC182 | — | — | — | — | 41.85 | — |
| HFC181a | — | — | — | — | 49.87 | Pt54Ti5W41 |
| HFC402 | — | — | — | — | 35.88 | — |
| HFC403 | — | — | — | — | 36.19 | — |
| HFC404 | — | — | — | — | 47.06 | — |
| HFC405 | — | — | — | — | 32.79 | — |
| HFC406 | — | — | — | — | 41.94 | — |
| HFC407 | — | — | — | — | 34.70 | — |
| HFC408 | — | — | — | — | 33.07 | — |
| HFC409 | — | — | — | — | 28.98 | — |
| HFC410 | — | — | — | — | 25.90 | — |
| HFC411 | — | — | — | — | 31.50 | — |
| HFC414 | — | — | — | — | 44.34 | — |
| HFC415 | — | — | — | — | 45.78 | — |
| HFC416 | — | — | — | — | 42.87 | — |
| HFC417 | — | — | — | — | 41.69 | — |
| HFC418 | — | — | — | — | 41.62 | — |
| HFC736 | 2.35 | 1.74 | 2.34 | 1.70 | 32.99 | Pt58Ti1W41 |
| HFC740 | 2.50 | 2.45 | 2.49 | 2.40 | 45.54 | Pt65Ti2W33 |
| HFC744 | 2.34 | 1.70 | 2.33 | 1.66 | 31.50 | Pt60Ti4W36 |
| HFC748 | 2.38 | 1.86 | 2.37 | 1.82 | 33.76 | Pt60Ti2W38 |
| HFC752 | 2.50 | 2.45 | 2.50 | 2.45 | 45.54 | Pt55Ti14W31 |
| HFC756 | 2.51 | 2.51 | 2.51 | 2.51 | 46.60 | Pt54Ti13W33 |
| HFC760 | 2.53 | 2.63 | 2.53 | 2.63 | 48.79 | Pt44Ti14W42 |
| HFC764 | 2.47 | 2.29 | 2.47 | 2.29 | 42.50 | Pt46Ti14W40 |
| HFC768 | 2.37 | 1.82 | 2.37 | 1.82 | 33.76 | Pt50Ti13W37 |
| HFC772 | 2.47 | 2.29 | 2.47 | 2.29 | 42.50 | Pt50Ti14W36 |
| HFC1235 | 2.47 | 2.30 | 2.46 | 2.22 | 50.67 | Pt59Ti25W16 |
| HFC1236 | 2.54 | 2.71 | 2.53 | 2.63 | 57.86 | Pt54Ti27W19 |
| HFC1237 | 2.44 | 2.16 | 2.43 | 2.10 | 47.54 | — |
| HFC1238 | 2.45 | 2.19 | 2.44 | 2.16 | 47.63 | — |
| HFC1239 | 2.42 | 2.05 | 2.41 | 1.98 | 47.29 | — |
| HFC1240 | 2.40 | 1.94 | 2.39 | 1.91 | 40.82 | — |
| HFC1241 | 2.42 | 2.05 | 2.42 | 2.05 | 43.33 | — |
| HFC1242 | 2.41 | 2.00 | 2.40 | 1.97 | 44.37 | — |
| HFC1243 | 2.48 | 2.36 | 2.48 | 2.32 | 53.93 | Pt64Ti24W12 |
| HFC1244 | 2.45 | 2.21 | 2.45 | 2.19 | 49.73 | — |
| HFC1245 | 2.48 | 2.33 | 2.48 | 2.34 | 50.65 | Pt50Ti40W10 |
| HFC1246 | 2.39 | 1.90 | 2.38 | 1.87 | 44.20 | — |
| HFC1318 | 2.49 | 2.38 | 2.48 | 2.37 | 54.67 | Pt62Ti31W6 |
| HFC1319 | 2.47 | 2.30 | 2.46 | 2.26 | 46.34 | — |
| HFC1320 | 2.50 | 2.46 | 2.50 | 2.47 | 50.70 | — |
| HFC1321 | 2.44 | 2.12 | 2.43 | 2.10 | 45.75 | Pt43Ti42W16 |
| HFC1322 | 2.41 | 1.98 | 2.41 | 1.99 | 45.79 | — |
| HFC1323 | 2.46 | 2.25 | 2.46 | 2.23 | 43.18 | — |
| HFC1324 | 2.41 | 2.01 | 2.41 | 2.00 | 39.12 | — |
| HFC1325 | 2.39 | 1.92 | 2.39 | 1.90 | 37.68 | — |
| HFC1326 | 2.45 | 2.17 | 2.45 | 2.17 | 47.89 | — |
| HFC1327 | 2.36 | 1.79 | 2.36 | 1.77 | 41.41 | — |
| HFC1328 | 2.47 | 2.29 | 2.47 | 2.31 | 53.15 | Pt80Ti12W8 |
| HFC1329 | 2.35 | 1.75 | 2.35 | 1.74 | 32.97 | — |
| HFC1330 | 2.42 | 2.05 | 2.42 | 2.06 | 43.52 | — |
| HFC1331 | 2.40 | 1.94 | 2.40 | 1.95 | 45.31 | — |
| HFC1332 | 2.39 | 1.89 | 2.39 | 1.90 | 34.04 | — |
| HFC1333 | 2.41 | 2.01 | 2.41 | 2.00 | 41.11 | — |
| HFC1334 | 2.36 | 1.78 | 2.36 | 1.77 | 40.14 | — |
| HFC1335 | 2.41 | 2.00 | 2.40 | 1.96 | 45.89 | — |
| HFC1336 | 2.46 | 2.21 | 2.45 | 2.19 | 46.40 | — |

TABLE D-continued

| | | | | | | |
|---|---|---|---|---|---|---|
| HFC1337 | 2.37 | 1.82 | 2.36 | 1.77 | 37.71 | — |
| HEC1338 | 2.47 | 2.29 | 2.46 | 2.26 | 45.55 | Pt39Ti42W19 |
| HFC1339 | 2.43 | 2.07 | 2.42 | 2.05 | 40.16 | — |
| HFC1340 | 2.41 | 1.98 | 2.40 | 1.95 | 35.48 | — |
| HFC1341 | 2.52 | 2.54 | 2.51 | 2.50 | 53.62 | Pt38Ti53W9 |
| HFC1380 | 2.44 | 2.13 | 2.46 | 2.23 | 49.08 | — |
| HEC1381 | 2.61 | 3.20 | 2.59 | 3.04 | 57.98 | Pt31Ti53W16 |
| HFC1382 | 2.58 | 2.96 | 2.59 | 3.02 | 65.17 | Pt39Ti55W6 |
| HFC1383 | 2.53 | 2.65 | 2.51 | 2.50 | 42.72 | — |
| HFC1384 | 2.62 | 3.25 | 2.62 | 3.23 | 68.29 | Pt29Ti67W4 |
| HFC1385 | 2.58 | 2.92 | 2.56 | 2.84 | 56.47 | Pt27Ti65W9 |
| HFC1386 | 2.51 | 2.50 | 2.49 | 2.37 | 42.76 | — |
| HFC1387 | 2.43 | 2.09 | 2.42 | 2.05 | 41.94 | — |
| HFC1389 | 2.51 | 2.50 | 2.51 | 2.51 | 42.43 | — |
| HFC1390 | 2.50 | 2.46 | 2.50 | 2.46 | 45.29 | — |
| HFC1391 | 2.52 | 2.58 | 2.53 | 2.61 | 48.08 | — |

Example 4

Evaluating the Catalytic Activity of Supported Catalysts

The supported catalysts set forth in Table D and formed according to Example 3 were subjected to electrochemical measurements to evaluate their activities. For the evaluation, the supported catalysts were applied to a rotating disk electrode (RDE) as is commonly used in the art (see, Rotating disk electrode measurements on the CO tolerance of a high-surface area Pt/Vulcan carbon fuel cell electrocatalyst, Schmidt et al., Journal of the Electrochemical Society (1999), 146(4), 1296-1304; and Characterization of high-surface-area electrocatalysts using a rotating disk electrode configuration, Schmidt et al., Journal of the Electrochemical Society (1998), 145(7), 2354-2358). Rotating disk electrodes are a relatively fast and simple screening tool for evaluating supported catalysts with respect to their intrinsic electrolytic activity for oxygen reduction (e.g., the cathodic reaction of a fuel cell).

The rotating disk electrodes were prepared by depositing an aqueous-based ink that comprises the supported catalyst and a NAFION solution on a glassy carbon disk. The concentration of catalyst powder in the NAFION solution was about 1 mg/ml. The NAFION solution comprised the perfluorinated ion-exchange resin, lower aliphatic alcohols and water, wherein the concentration of resin is about 5 percent by weight. The NAFION solution is commercially available from the ALDRICH catalog as product number 27,470-4. The glassy carbon electrodes were 5 mm in diameter and were polished to a mirror finish. Glassy carbon electrodes are commercially available, for example, from Pine Instrument Company of Grove City, Pa. For each electrode, an aliquot of 10 µL of the catalyst suspension was added to the carbon substrate and allowed to dry at a temperature between about 60 and 70° C. The resulting layer of NAFION and catalyst was less than about 0.2 µm thick. This method produced slightly different platinum loadings for each electrode made with a particular suspension, but the variation was determined to be less than about 10 percent by weight.

After being dried, each rotating disk electrode was immersed into an electrochemical cell comprising an aqueous 0.5 M $H_2SO_4$ electrolyte solution maintained at room temperature. Before performing any measurements, the electrochemical cell was purged of oxygen by bubbling argon through the electrolyte for about 20 minutes. All measurements were taken while rotating the electrode at about 2000 rpm, and the measured current densities were normalized either to the glassy carbon substrate area or to the platinum loading on the electrode. Two groups of tests were performed to screen the activity of the supported catalysts. The first group of tests comprised cyclic voltammetric measurements while purging the electrolyte with argon. Specifically, the first group comprised:

a. two consecutive potential sweeps starting from OCP to about +0.35V then to about −0.65V and back to OCP at a rate of about 50 mV/s;
 b. two hundred consecutive potential sweeps starting from OCP to about +0.35V then to about −0.65V and back to OCP at a rate of about 200 mV/s; and
 c. two consecutive potential sweeps starting from OCP to about +0.35V then to about −0.65V and back to OCP at a rate of about 50 mV/s.

The second test comprised purging with oxygen for about 15 minutes followed by a potential sweep test for oxygen reduction while continuing to purge the electrolyte with oxygen. Specifically, potential sweeps from about −0.45 V to +0.35 V were performed at a rate of about 5 mV/s to evaluate the initial activity of the catalyst as a function of potential and to create a geometric current density plot. The catalysts were evaluated by comparing the diffusion corrected activity at 0.15 V. All the foregoing test voltages are with reference to a mercury/mercury sulfate electrode. Also, it is to be noted that the oxygen reduction measurements for a glassy carbon RDE without a catalyst did not show any appreciable activity within the potential window.

The above-described supported catalyst compositions were evaluated in accordance with the above-described method and the results are set forth in Table D. It is to be noted from the results presented therein that numerous carbon supported catalyst compositions exhibited an oxygen reduction activity which exceeded, for example, the carbon supported platinum standard (see, e.g., the catalyst compositions corresponding to HFC 181a, 760, 1235, 1236, 1243, 1244, 1245, 1318, 1320, 1328, 1341, 1380, 1381, 1382, 1384, and 1385).

The results of the evaluation indicate that a supported catalyst of the present invention may be produced using different process temperatures and durations. It is to be noted, however, that it may take numerous iterations to develop a set of optimum parameters for producing a particular catalyst composition. Also evidenced by the data is that activity may be adjusted by changes in the processing conditions.

Further, without being held to a particular theory, it is presently believed that differences in activity for similar catalyst compositions may be due to several factors such as homogeneity (e.g., an alloy, as defined herein, may have regions in which the constituent atoms show a presence or lack of order, i.e., regions of solid solution within an ordered lattice, or some such superstructure), changes in the lattice parameter due to changes in the average size of component atoms, changes in particle size, and changes in crystallographic structure/symmetry. The ramifications of structure and symmetry changes are often difficult to predict. For example, in the Pt—Ti system, as the amount of titanium added to platinum increases, the lattice of the resulting alloy may be expected to change from a cubic face centered lattice (100% platinum) to a structurally similar cubic primitive lattice ($Pt_3Ti$). Upon further addition of titanium, the resulting structure may change significantly as compared to the original cubic face centered lattice. Within the Pt—W system, solid solutions have been reported at the composition of PtW, however other structure types unrelated to the cubic face centered lattice have also been described. In the ternary Pt—Ti—W system, some combination of both behaviors may be expected however differences in metal radius or electronic characteristics as well as exact synthetic conditions make it difficult to predict exactly what may occur. Without being held to a particular theory, the possibility exists that as the relative ratio of titanium and tungsten to platinum increases, a solid solution may crystallize (e.g., Ti/W and Pt may mix randomly within some concentration limits, or under some specific synthesis conditions), and out of this solid solution an ordered phase may gradually crystallize (e.g., Pt(Ti,W)) only to return to a solid solution (disordered alloy) and again back to an ordered phase, as the formula PtTiW (e.g., $Pt_{35}Ti_{35}W_{30}$) is reached.

Symmetry changes (e.g., those associated with the changes from a cubic face centered structure to a primitive cubic structure, for example) may result in significant changes in the X-ray diffraction pattern. These changes may also be accompanied by more subtle changes in lattice parameters that may be indicative of the resulting changes in the size of the respective metal constituents. For example, the 12-coordinate metallic radii of platinum, titanium and tungsten are 1.39 Å, 1.46 Å, and 1.41 Å, respectively, and as one metal is substituted for another, the average metal radius, and consequently the observed lattice parameter may be expected to shrink or expand accordingly. The average radius may thus be used as an indicator of lattice changes as a function of stoichiometry, or alternatively, as an indicator of stoichiometry based on observed lattice parameters. It should be noted, however, that while average radii may be useful as a general rule, experimental results should be expected to conform only in a general manner because local ordering, significant size disparity between atoms, significant changes in symmetry, and other factors may produce values that are inconsistent with expectations. Occasionally the use of alternative metallic radii may be informative. One such alternative radius concept approximates metal radii using known crystallographically ordered Pt-based alloys such as $Pt_3Ti$ or $Pt_{50}W_{50}$ (in both cases, cubic symmetry is maintained) instead of pure metals. In this case, the same close-packed geometric arguments are relevant with the exception that the lattice parameter of the ordered metal alloy is used in conjunction with the accepted 12-coordinate metallic radius of platinum, supra. Using these concepts, effective radii of titanium and tungsten are 1.36 Å and 1.395 Å, respectively.

An interpretation of XRD analyses for a few of the foregoing supported catalysts are set forth below. Interpretation of XRD analyses can be subjective, and therefore, the following conclusions are not intended to be limiting.

$Pt_{30}Ti_{22}W_{48}$ (HFC 181 and 182, $Pt_{30}Ti_{24}W_{46}$ actual): The predicted change in average radius based on the targeted and actual stoichiometries was a decrease of approximately 0.2% versus platinum. XRD measurements of HFC 181 indicated a very slight decrease (−0.1%) compared to platinum, however small levels of non-alloyed titanium and tungsten metals were present. XRD measurements of HFC 182 indicated a slight increase (+0.6%) compared to platinum. It is noted that impurity levels are difficult to establish, however peak shape irregularities indicate their likely presence. No obvious ordering is seen in either sample.

$Pt_{25}Ti_{70}W_5$ (HFC 1384, $Pt_{29}Ti_{65}W_6$ actual): The predicted change in average radius based on the actual stoichiometry was a decrease of 1.3% versus platinum. XRD measurements of HFC 1384 indicated virtually no shift compared to platinum. $TiO_2$ (anatase structure) was also present, however. It is to be noted that XRD measurements conducted before and after the electrochemical measurement are unchanged.

In view of the foregoing, for a particular catalyst composition a determination of the optimum conditions is preferred to produce the highest activity for that particular composition. In fact, for certain catalyst compositions, different structural characteristics may define what exactly is described as a "good" catalyst. These characteristics may include differences in the composition (as viewed by lattice parameter), crystallinity, crystallographic ordering and/or particle size. These characteristics are not necessarily predictable and may depend on a complex interplay between starting materials, synthesis method, synthesis temperature and composition. For example, the starting materials used to synthesize the catalyst alloy may play a role in the activity of the synthesized catalyst alloy. Specifically, using something other than a metal nitrate salt solution to supply the metal atoms may result in different activities. Additionally, alternative Pt sources may be employed. Freeze-drying and heat treatment parameters such as atmosphere, time, temperature, etc. may also require optimization. This optimization may be compositionally dependent. Additionally, this optimization may involve balancing competing phenomena. For example, increasing the heat treatment temperature is generally known to improve the reduction of a metal salt to a metal, which typically increases activity; but it also tends to increase the size of the catalyst alloy particle and decrease surface area, which decreases electrocatalytic activity.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said" are intended to mean that there are one or more of the elements. The terms "comprising", "including" and "having" are intended to be inclusive and mean that there may be additional elements other than the listed elements.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. A catalyst for use in oxidation or reduction reactions, the catalyst comprising platinum, titanium, and tungsten, wherein the platinum concentration is between about 30 and about 50 atomic percent, the titanium concentration is no greater than about 20 atomic percent, and the tungsten concentration is between about 40 and about 60 atomic percent.

2. The catalyst of claim 1 wherein the platinum concentration is between about 35 and about 45 atomic percent, the titanium concentration is between about 5 and about 15 atomic percent, and the tungsten concentration is between about 45 and about 55 atomic percent.

3. The catalyst of claim 2 consisting essentially of platinum, titanium and tungsten.

4. The catalyst of claim 2 wherein the catalyst comprises an alloy of platinum, titanium and tungsten.

5. The catalyst of claim 2 wherein the catalyst consists essentially of an alloy of platinum, titanium and tungsten.

6. A supported electrocatalyst powder for use in electrochemical reactor devices, the supported electrocatalyst powder comprising the catalyst of claim 2 and electrically conductive support particles upon which the catalyst is dispersed.

7. The catalyst of claim 1 wherein the titanium concentration is between about 2 and about 12 atomic percent.

8. The catalyst of claim 1 consisting essentially of platinum, titanium and tungsten.

9. The catalyst of claim 1 wherein the catalyst comprises an alloy of platinum, titanium and tungsten.

10. The catalyst of claim 1 wherein the catalyst consists essentially of an alloy of platinum, titanium and tungsten.

11. A supported electrocatalyst powder for use in electrochemical reactor devices, the supported electrocatalyst powder comprising the catalyst of claim 1 and electrically conductive support particles upon which the catalyst is dispersed.

12. A catalyst for use in oxidation or reduction reactions, the catalyst comprising platinum, titanium, and tungsten, wherein the platinum concentration is between about 20 and about 40 atomic percent, the titanium concentration is between about 25 and about 45 atomic percent, and the tungsten concentration is between about 30 and about 50 atomic percent.

13. The catalyst of claim 12 wherein the platinum concentration is between about 25 and about 35 atomic percent, the titanium concentration is between about 30 and about 40 atomic percent, and the tungsten concentration is between about 35 and about 45 atomic percent.

14. The catalyst of claim 13 consisting essentially of platinum, titanium and tungsten.

15. The catalyst of claim 13 wherein the catalyst comprises an alloy of platinum, titanium and tungsten.

16. The catalyst of claim 13 wherein the catalyst consists essentially of an alloy of platinum, titanium and tungsten.

17. A supported electrocatalyst powder for use in electrochemical reactor devices, the supported electrocatalyst powder comprising the catalyst of claim 13 and electrically conductive support particles upon which the catalyst is dispersed.

18. The catalyst of claim 12 consisting essentially of platinum, titanium and tungsten.

19. The catalyst of claim 12 wherein the catalyst comprises an alloy of platinum, titanium and tungsten.

20. The catalyst of claim 12 wherein the catalyst consists essentially of an alloy of platinum, titanium and tungsten.

21. A supported electrocatalyst powder for use in electrochemical reactor devices, the supported electrocatalyst powder comprising the catalyst of claim 12 and electrically conductive support particles upon which the catalyst is dispersed.

22. A catalyst for use in oxidation or reduction reactions, the catalyst comprising platinum, titanium, and tungsten, wherein the platinum concentration is between about 15 and about 45 atomic percent, the titanium concentration is between about 40 and about 75 atomic percent, and the tungsten concentration is between about 5 and about 20 atomic percent.

23. The catalyst of claim 22 wherein the platinum concentration is between about 20 and about 45 atomic percent.

24. The catalyst of claim 22 wherein the platinum concentration is between about 20 and about 40 atomic percent, the titanium is at a concentration is between about 50 and about 65 atomic percent, and the tungsten is at a concentration is between about 5 and about 15 atomic percent.

25. The catalyst of claim 24 consisting essentially of platinum, titanium and tungsten.

26. The catalyst of claim 24 wherein the catalyst comprises an alloy of platinum, titanium and tungsten.

27. The catalyst of claim 24 wherein the catalyst consists essentially of an alloy of platinum, titanium and tungsten.

28. A supported electrocatalyst powder for use in electrochemical reactor devices, the supported electrocatalyst powder comprising the catalyst of claim 24 and electrically conductive support particles upon which the catalyst is dispersed.

29. The catalyst of claim 22 consisting essentially of platinum, titanium and tungsten.

30. The catalyst of claim 22 wherein the catalyst comprises an alloy of platinum, titanium and tungsten.

31. The catalyst of claim 22 wherein the catalyst consists essentially of an alloy of platinum, titanium and tungsten.

32. A supported electrocatalyst powder for use in electrochemical reactor devices, the supported electrocatalyst powder comprising the catalyst of claim 22 and electrically conductive support particles upon which the catalyst is dispersed.

* * * * *